235-411 SR REFERENCE SEARCH ROOM
XR 3,019,968
X 65123
X 64971
(4)

Feb. 6, 1962 L. W. IMM 3,019,968

MECHANICAL FIRE CONTROL COMPUTER SOLVING TRIGNOMETRIC EQUATIONS

Filed Nov. 4, 1949

15 Sheets-Sheet 1

INVENTOR.
LEWIS W. IMM,
BY Hastings W. Baker
ATTORNEY.

Feb. 6, 1962 L. W. IMM 3,019,968

MECHANICAL FIRE CONTROL COMPUTER SOLVING TRIGNOMETRIC EQUATIONS

Filed Nov. 4, 1949 15 Sheets-Sheet 2

INVENTOR.
LEWIS W. IMM,

BY Hastings W. Baker

ATTORNEY.

INVENTOR.
LEWIS W. IMM,
BY Hastings W. Baker
ATTORNEY.

INVENTOR.
LEWIS W. IMM,
BY Hastings W. Baker
ATTORNEY.

INVENTOR.
LEWIS W. IMM,
BY Hastings W Baker
ATTORNEY.

INVENTOR.
LEWIS W. IMM,
BY Hastings W. Baker
ATTORNEY.

INVENTOR.
LEWIS W. IMM,
BY Hastings W. Baker.
ATTORNEY.

Feb. 6, 1962 L. W. IMM 3,019,968

MECHANICAL FIRE CONTROL COMPUTER SOLVING TRIGNOMETRIC EQUATIONS

Filed Nov. 4, 1949

15 Sheets-Sheet 8

INVENTOR.
LEWIS W. IMM,

BY Hastings W. Baker

ATTORNEY.

MECHANICAL FIRE CONTROL COMPUTER SOLVING TRIGNOMETRIC EQUATIONS

INVENTOR.
LEWIS W. IMM,
BY Hastings W. Baker
ATTORNEY.

Feb. 6, 1962 L. W. IMM 3,019,968

MECHANICAL FIRE CONTROL COMPUTER SOLVING TRIGNOMETRIC EQUATIONS

Filed Nov. 4, 1949 15 Sheets-Sheet 10

INVENTOR.
LEWIS W. IMM,

BY Hastings W. Baker

ATTORNEY.

INVENTOR.
LEWIS W. IMM,
BY Hastings W. Baker
ATTORNEY.

Feb. 6, 1962 L. W. IMM 3,019,968

MECHANICAL FIRE CONTROL COMPUTER SOLVING TRIGNOMETRIC EQUATIONS

Filed Nov. 4, 1949 15 Sheets-Sheet 12

LEWIS W. IMM
Inventor

By
Naylor and Lassagne
Attorneys

LEWIS W. IMM
INVENTOR
BY Naylor and Lassagne
ATTORNEYS

Feb. 6, 1962 L. W. IMM 3,019,968

MECHANICAL FIRE CONTROL COMPUTER SOLVING TRIGNOMETRIC EQUATIONS

Filed Nov. 4, 1949 15 Sheets-Sheet 14

LEWIS W. IMM
INVENTOR

By

Naylor and Lassagne
Attorneys

Feb. 6, 1962 L. W. IMM 3,019,968

MECHANICAL FIRE CONTROL COMPUTER SOLVING TRIGNOMETRIC EQUATIONS

Filed Nov. 4, 1949 15 Sheets-Sheet 15

LEWIS W. IMM

Inventor

By Naylor and Lassagne

Attorn 3,019,968

MECHANICAL FIRE CONTROL COMPUTER, SOLVING TRIGONOMETRIC EQUATIONS

Lewis W. Imm, Los Angeles, Calif., assignor to General Precision Inc., a corporation of Delaware Filed Nov. 4, 1949, Ser. No. 125,629
9 Claims. (Cl. 235—61)

The present invention relates to computers of the linkage network type and more particularly to a computer of this type for the solution of trigonometric equations.

Bar linkages are adaptable to the performance of a wide variety of calculations and the generation of a substantially unlimited number of mathematical functions. By grouping such linkage together or combining them with other computing components they can be used to solve many complex mathematical problems. However, the creating of such combinations presents the problem of avoiding an increase in structural complexity proportionate to the complexity of the calculation to be effected.

The present invention is directed primarily toward the provision of linkage networks for the solution of simultaneous trigonometric equations whereby the unknown sides, or angles, or the area of a triangle of any shape may be determined from data sufficient to compute these values by trigonometry. One useful embodiment of the invention is disclosed as an anti-aircraft barrage fire control computer, in which form the present invention was disclosed in my copending application, Serial No. 444,573, filed May 26, 1942, now abandoned, of which the present application is a continuation in part. However, the complexity of such a computer is so great that it is much more difficult to understand certain fundamental aspects of the invention therefrom, and there is also disclosed herein, therefore, a general purpose triangle solver which is of simpler construction while embodying many of the same principles.

The general purpose triangle solver herein disclosed employs a combination of two right-triangle solving mechanisms to solve a triangle other than a right-triangle; this being feasible because any triangle may be divided into two right-triangles each having one side equal to the altitude of the divided triangle. Area is calculated by solving the equation:

$$\tfrac{1}{2}R_s \sin\alpha(V\cos\beta+R_s\cos\alpha)=\text{area}$$

where V and $R_s$ are each a hypotenuse of one right triangle, and $\alpha$ and $\beta$ are the undivided angles of the divided triangle. The divided side of the original non-right-triangle, designated C, is calculated by solving the equation:

$$V\cos\beta+R_s\cos\alpha=C$$

Any of the quantities V, $R_s$, $\alpha$ or $\beta$ which may be unknown (the other three being known) is determined by balancing the equation:

$$V\sin\beta-R_s\sin\alpha=0$$

The same equation-balancing principles are employed in the anti-aircraft barrage fire control computer, but since the mathematical treatment is much more complex it will be set forth in the detailed description of this embodiment, hereinafter.

The invention, together with additional objectives and advantages thereof, will be best understood from the following description when read in connection with the accompanying drawings.

Figure 20:
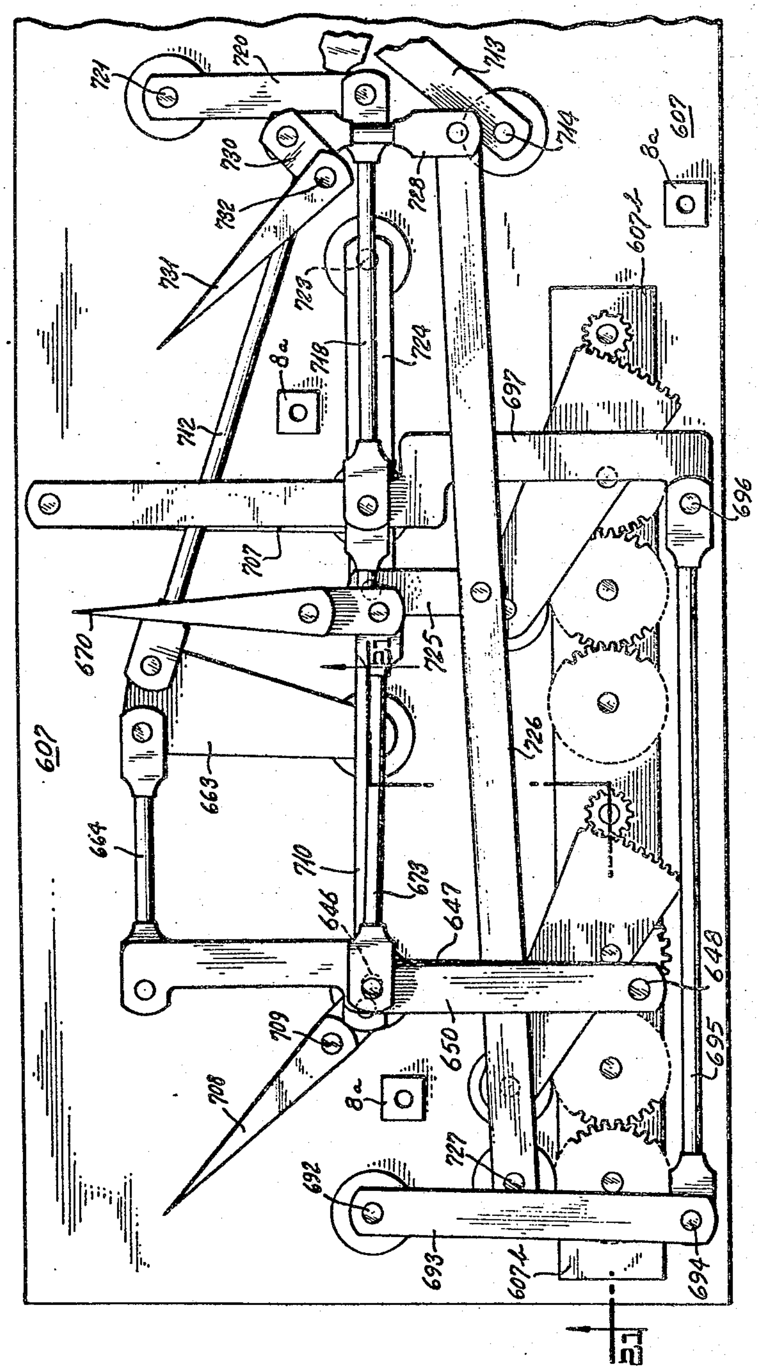
Figure 22:
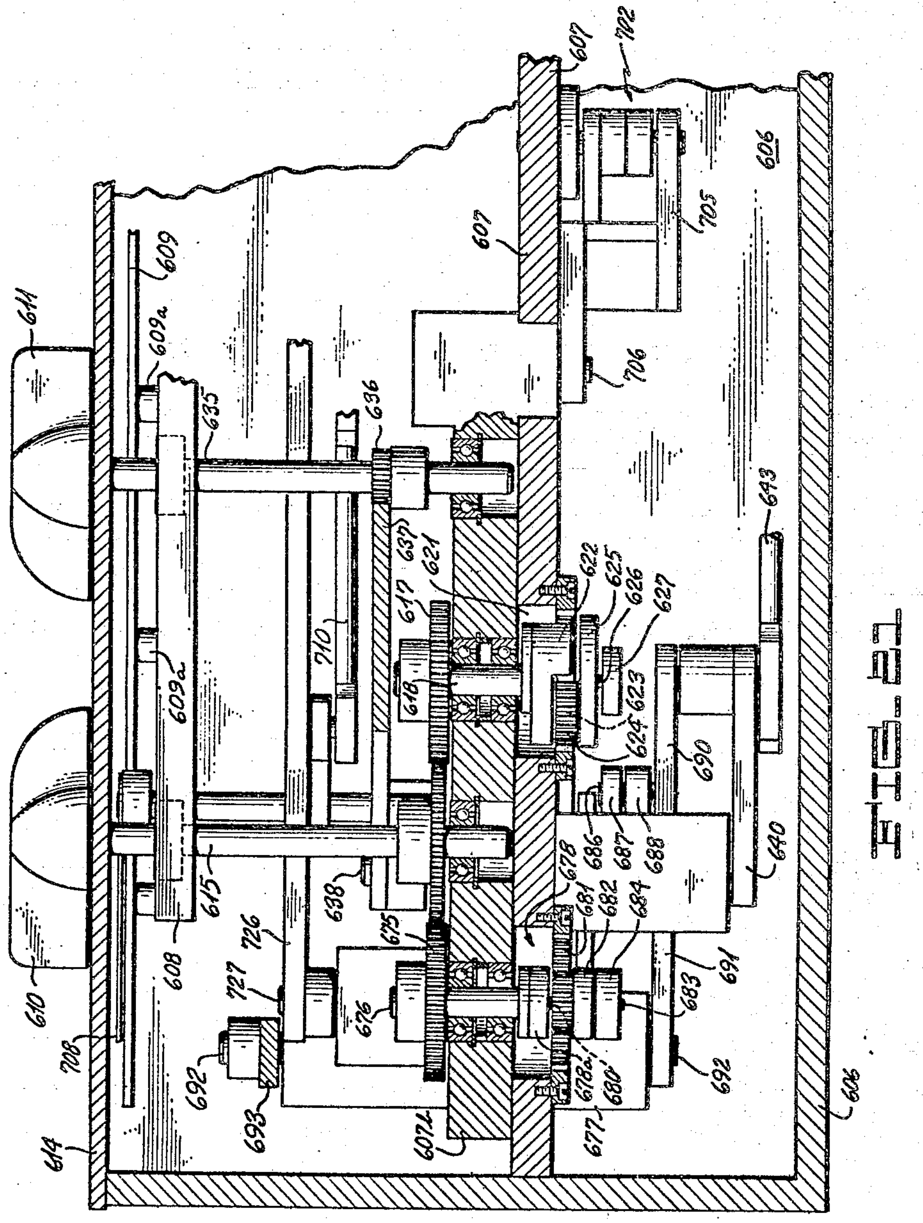

In FIGURES 2 to 14, inclusive, the rear cover plate has been removed so as to disclose the internal mechanism;

FIGURE 18 is a view in front elevation of a general purpose triangle solver embodying the present invention;

FIGURE 19 is a rear view of the triangle solver of FIGURE 18 with the rear cover removed to expose the mechanism;

FIGURE 20 is a front view thereof with the face plate, dial plate and top plate removed to expose underlying parts; and FIGURE 21 is a partial sectional view taken on the line 21—21 of FIGURE 20.

Considering, first, the anti-aircraft barrage fire control computer of FIGURES 1 to 17, inclusive, the present invention is designed to provide the necessary data for directing a barrage of predetermined duration in such a way as to intercept an attacking plane. The mathematics of this problem are diagrammed in FIGURES 15, 16 and 17.

Figure 15:
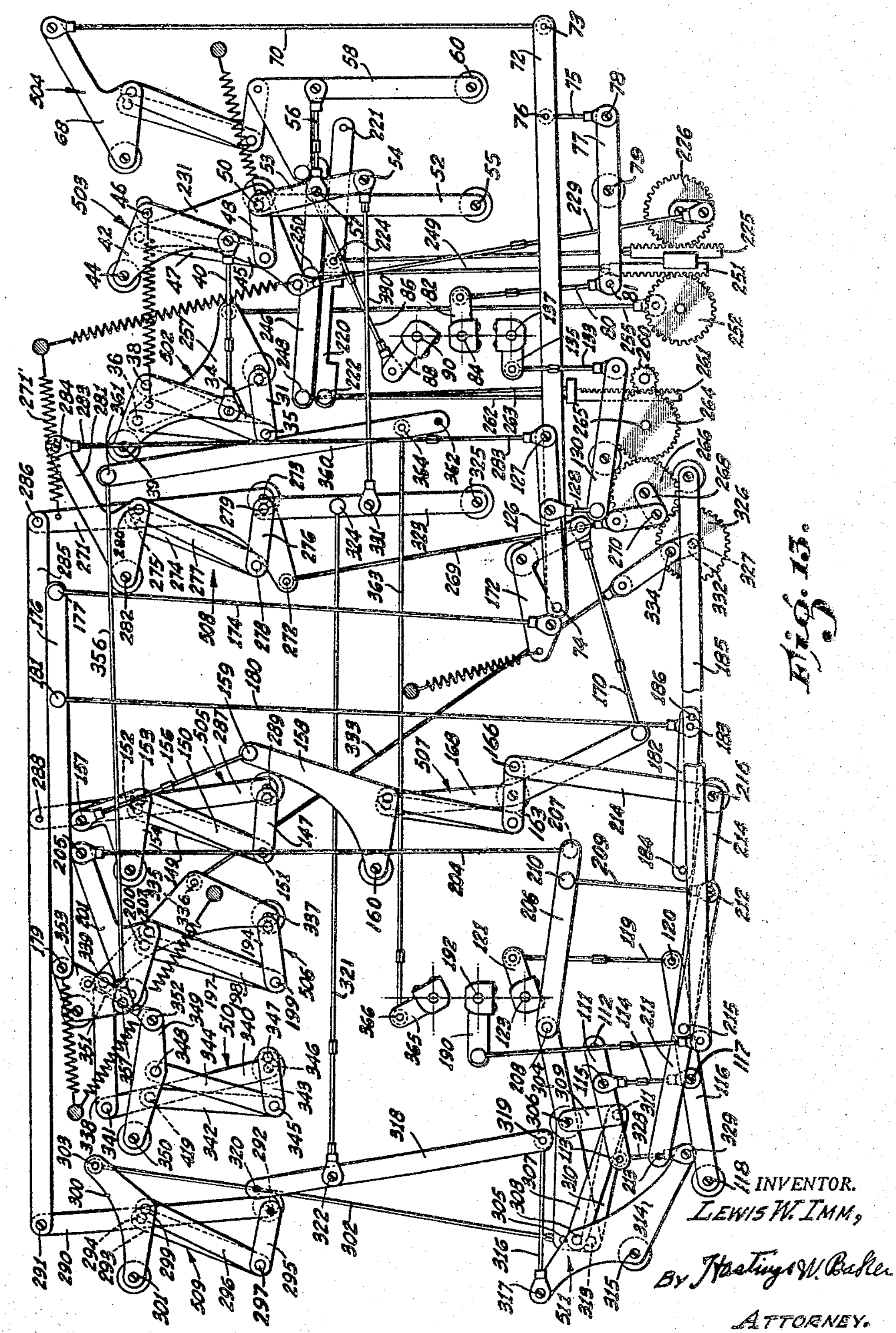
FIGURES 15, 16 and 17 are geometrical diagrams to illustrate the theory of the operations and the derivation of certain of the formulas involved.

Referring to FIGURE 15, let it be presumed that the operator at firing station O observes the approaching plane at A. As a matter of fact, the operator has first observed the plane prior to its reaching the point A, has identified the type of plane so that he knows its cruising speed of $Vp$, as well as its altitude $h$.

Let it further be presumed that the plane will maintain this altitude and will fly directly over the point O, releasing its bombs so as to strike the point O. The operator also knows the velocity, $Vb$, of the projectile. The operator will require some period of time in order to operate the calculator so as to secure the desired data for firing. Assuming that this preparation time is $Tx$, during which time the plane would have progressed from the point A to B, a distance of $TxVp$. When the plane is at the point B the first shot is fired at the plane. Of course it is fired in advance of the point B so that it bursts at the point $L_2$, which is the beginning of the barrage.

The duration of the barrage in seconds has previously been determined by the operator. At the end of one-half of the barrage time the plane would have advanced to the point C, the distance BC being $1/2TbVp$. While the plane progresses from B to C, the gun is constantly fired. When it arrives at the point C, which is the position of the plane when the midshot of the barrage is fired, the projectile is fired which should make a direct hit at the point D.

The gun is at all times pointing in advance of the telescopic sight trained on the plane. For instance, when the plane is at C, the telescopic sight would be along the line OC, but the gun would be pointing along the line OE. The projectile would be propelled from the gun along the line OE, but its trajectory would cause it to deviate from the line OE to the point D along the dotted line.

Obviously the dotted line OD, which at its lower end coincides with the line OE, is a longer line than the direct line OD, but the difference is very small and the average velocity of the bullet, or projectile V*b*, is considered as though it had travelled the straight line OD.

The length of the line OD is obviously the velocity of the projectile V*b* multiplied by *t*, which is the time in seconds set for it to explode. Since the shot fired when the plane was at the point C is supposed to meet the plane at the point D, and to explode directly at the plane, the distance DC is equal to the velocity of the plane, $Vp \times t$, or $Vpt$.

As the plane continues its movement, in case it is not brought down, from D toward F, the barrage would continue so that the entire barrage, or the line indicating the bursts, is $L_1L_2$, which is theoretically an arc having a center O and a radius OD. It will be noted that the first burst at $L_2$ is below the position of the plane if the plane continued at a uniform altitude *h*, while the last part of the barrage from D to $L_1$ would cause explosions to take place above the altitude *h*.

The reasons are twofold. First, explosions cannot be predicted precisely. Two projectiles having exactly the same fuze setting and firing along the same line, might explode at slightly different points. Some of the explosions might, therefore, occur anywhere between slightly below or slightly above the arc $L_1L_2$. The second reason is, that the pilot will notice that he is flying into an anti-aircraft barrage, and he might dive. In that case he would dive directly into that part of the barrage between D and $L_2$. On the other hand, he might climb, in which case he would climb into that part of the barrage between D and $L_1$.

The angle (*a*) is known as the sight elevation angle, or the super elevation angle, and means that the gun actually points at an angle (*a*) from where it is expected that the projectile will explode. In FIGURE 15, therefore, the gun is pointed along the line OE, whereas the explosion will take place at D, and the angle between the lines OE and OD is angle (*a*). The lead angle (*b*) represents the amount of divergence between the line OC, which represents the telescopic sight between the station O and the then position of the plane at C and the line OD, which represents the straight line between the station O and the point of the burst of the projectile being fired.

The sight angle is the sum of *a*, plus *b*, and is the angle between the telescopic sight trained on the plane and the actual direction in which the gun is trained. The angle *c* and *d* are not calculated in the computer and are useful merely in describing FIGURE 15.

The angle (*e*) is the target position angle and represents the angle formed by the horizontal line from O and the line drawn from O to A, it being remembered that the point A is the position of the plane when the operator starts his calculations. The angle (*g*) is the advance position angle and is the sum of angles *b*, *c*, *d*, and *e*, or is the angle formed between the horizontal line from O and the line OD, it being remembered that the point D is the point of the explosion of the projectile at the middle of the barrage. The line OA will generally, hereafter, be referred to as R*s*, meaning slant range. It will, therefore, be remembered hereafter that slant range is the distance from the station O to the point A which is the position of the plane at the commencement of the preparation time, T*x*.

From this, FIGURE 15, one of the formulas which is involved may be directly calculated. Obviously, sin *g* equals $$\frac{H}{OD}$$

so that $OD(\sin g)=h$. However, the line OD is equal to $Vbt$, so that $Vbt \sin g-h=0$. Formula No. 1.

Figure 17:
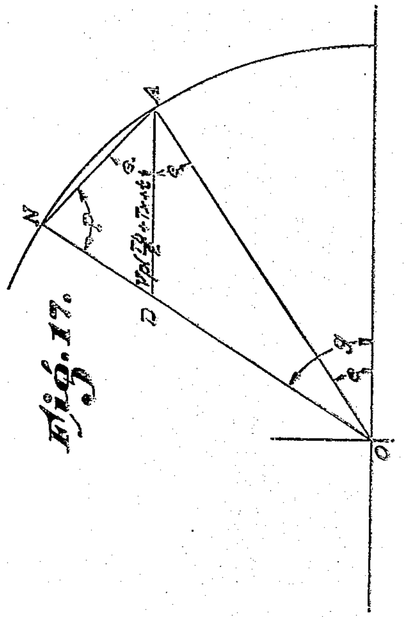

In FIGURE 17 the line DA is obviously the sum of the lines DC, plus CB, plus BA of FIGURE 15, or $$Vp\left(\frac{Tb}{2}+Tx+t\right)$$

Using the line OA as a radius, construct an arc of a circle having a center O and extend the line OD to the point of intersection N with the said arc. The angle DNA will be called P, and the angle NAD will be called Q. The angle DAO is obviously *e*. The line OA equals the line ON, or $OD+DN$. Since the line OD equals $Vbt$, this expression might be written as $OA=DN+Vbt$. The angle $$P=\frac{180^\circ-(g-e)}{2}=90^\circ-\frac{(g-e)}{2}$$

The angle $$Q=\frac{180^\circ-(g-e)}{2}-e=90^\circ-\frac{(g+e)}{2}$$

$$\frac{\sin P}{Vp\left(\frac{Tb}{2}+Tx+t\right)}=\frac{\sin Q}{DN}$$

Therefore $$DN=\sin Q\,Vp\left(\frac{\frac{Tb}{2}+Tx+t}{\sin P}\right)$$

However, $$\sin Q=\sin\left(90^\circ-\frac{g+e}{2}\right)=\cos\frac{g+e}{2}$$

and $$\sin P=\sin\left(90^\circ-\frac{g-e}{2}\right)=\cos\frac{g-e}{2}$$

Therefore $$DN=\frac{\cos\left(\frac{g+e}{2}\right)Vp\left(\frac{Tb}{2}+Tx+t\right)}{\cos\frac{g-e}{2}}$$

Therefore, OA, or R*s*, that is the slant range, is equal to:

$$Vp\left(\frac{Tb}{2}+Tx+t\right)\left(\frac{\cos\frac{g+e}{2}}{\cos\frac{g-e}{2}}\right)+Vbt$$

Formula No. 2

Referring again to FIGURE 15, it will be noted that $$\sin e=\frac{h}{R_s}\text{ or }h=R_s\sin e$$

Combining this with Formula No. 2

$$h=\sin e\left\{Vp\left(\frac{Tb}{2}+Tx+t\right)\left(\frac{\cos\frac{g+e}{2}}{\cos\frac{g-e}{2}}\right)+Vbt\right\}$$

or $$\sin e\left\{Vp\left(\frac{Tb}{2}+Tx+t\right)\left(\frac{\cos\frac{g+e}{2}}{\cos\frac{g-e}{2}}\right)+Vbt\right\}-h=0$$

Formula No. 3

The reasons that Formulas 1 and 3 are written so as to equal 0 is because, as will hereinafter be explained, the target position angle balance pointer 85 is balanced at a zero position, which is at its midposition, and the advance position angle balance pointer 138 is likewise balanced at its zero or midposition. In operating the computer, no reading should be taken until the said pointers 85 and 138 are both in their zero or midpositions.

In firing projectiles, it is well known that they rotate on their axes which, in addition to crosswind drift, may cause them to deviate slightly to the right or the left of the true vertical plane in which they are fired. This is corrected by the deflection spot knob 407, as will hereafter be explained. The amount of this deflection is dependent upon the time of flight and the advance position angle $g$, as well as by the correction set by the deflection spot knob 407. It is further found that this deflection, which is a function of $t$ and $g$ might be expressed as a function of angle $a$, so that the deflection setting pointer 368 would represent a function of $t$ and $g$, plus deflection spot, or angle ($a$) plus deflection spot. Formula No. 4.

No correction is required for the distance traveled by the projectile during the first few seconds of its flight, regardless of the direction in which the projectile is fired, but a correction is required for that period of time after the first few seconds because it is known that its velocity varies depending upon whether it is fired horizontally, vertically, or in an intermediate direction. Therefore, certain parts are moved in accordance with a function of time instead of the value $t$, as will be hereinafter explained.

It is impracticable to give an exact equation for Formula No. 4, for the formula would be variable according to different caliber guns and the information on which any equation would be formulated would be derived from a study of various graphs which would be derived from ballistic data, which ballistic data would vary with different caliber guns. However, the parts shown in the drawing in this case are drawn substantially to scale to represent one particular caliber.

Figure 16:
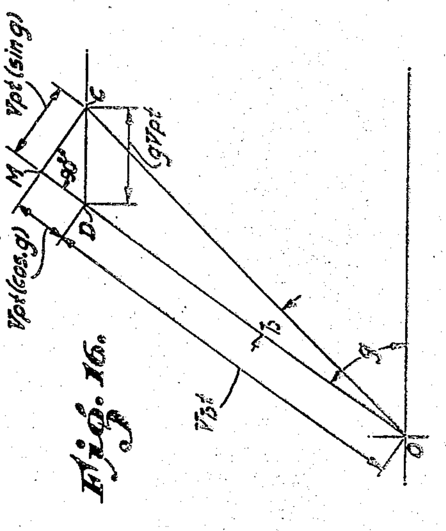

The sight angle, ($a$) plus ($b$) may be calculated from FIGURE 16. A perpendicular is drawn from the point C to the line OD extended, meeting the said line at the point M. The angle DMC is, therefore, a right angle, and the angle MDC is equal to the angle $g$, while the line DC is equal to V$pt$. Considering the small triangle DMC, the line MC equals $Vpt \sin g$, and the line DM equals $Vpt \cos g$, while the line OD equals V$bt$.

$$\text{Tan } b=\frac{Vpt \sin g}{Vbt+Vpt \cos g}$$

However, in the computer, V$pt$ is represented in knots, while V$bt$ is represented in feet per second. 1.689 is the conversion factor from knots to feet per second. It will also be noted that $t$ may be eliminated from the equation. The above equation might, therefore, be written:

$$\tan b=\frac{1.689 Vp \sin g}{Vb+1.689 Vp \cos g}$$

or $$b=\tan^{-1}\left(\frac{1.689 Vp \sin g}{Vb+1.689 Vp \cos g}\right)$$

The super elevation angle $a$, not shown in FIGURE 16, is derived from ballistic data and is a function of time $t$ and the angle $g$. The sight angle is the sum of the angles ($a$) plus ($b$), so that the sight angle equals:

$$a+b=a+\tan^{-1}\left(\frac{1.689 Vp \sin g}{Vb+1.689 Vp \cos g}\right)$$

However, this conversion from knots to feet per second is performed by properly proportioning the various parts of the computer and this formula might, therefore, be written in a simplified form as follows:

$$\text{Sight angle equals } a+b=a+\tan^{-1}\left(\frac{Vp \sin g}{Vb+Vp \cos g}\right)$$

If the operator finds that the explosions occur in front of, or behind, the plane and it is, therefore, necessary to correct the elevation of the gun, an adjusting knob called elevation spot and represented by the reference character 415 is provided. The amount of this correction should, therefore, be included in the above equation, provided it is necessary to make such correction. In this case the formula would read:

Sight angle $=a+b+$Elevation Spot $$=a+\tan^{-1}\left(\frac{Vp \sin g}{Vb+Vp \cos g}\right)+\text{Elevation Spot}$$

Formula No. 5

The powder fuze is sometimes employed. The computer is adapted for both mechanical fuzes and powder fuzes. Powder fuzes burn more rapidly at low altitudes than at high altitudes, because there is a greater oxygen content when the air is more dense than when it is more rarefied, such as in high altitudes. The rate of the burning of a powder fuze is, therefore, dependent upon time $t$, altitude $h$ and the angle $g$. Or it might be expressed as a function of $t$, minus a function of $h$, multiplied by a function of $t$ times a function of $g$. Formula No. 6. It is impossible to express this as a general mathematical formula for the same reasons as discussed in connection with Formula No. 4.

Summarizing the above, the advanced position angle balance pointer 138 is balanced in zero, or midposition, when $Vbt \sin g-h=0$. Formula No. 1.

The target position angle balance pointer 85 is balanced in its zero, or midposition when, $$\sin e\left\{Vp\left(\frac{Tb}{2}+Tx+t\right)\left(\frac{\cos\frac{g+e}{2}}{\cos\frac{g-e}{2}}\right)+Vbt\right\}-h=0$$

Formula No. 3

The slant rang pointer 91 gives a visual indication of the length of the line R$s$, which is the slant range and solves the equation:

$$Rs=Vp\left(\frac{Tb}{2}+Tx+t\right)\left(\frac{\cos\frac{g+e}{2}}{\cos\frac{g-e}{2}}\right)+Vbt$$

Formula No. 2

The deflection setting pointer 368 is considered as at zero when it points to the numeral 500, which is its midposition, and gives a direct reading of the angle ($a$), plus deflection spot. Formula No. 4.

The sight angle pointer 193 indicates the sum of the angles ($a$) plus ($b$) plus elevation spot and is actuated to solve the formula:

$$\text{Sight angle}=a+\tan^{-1}\left(\frac{Vp \sin g}{Vb+Vp \cos g}\right)+\text{Elevation Spot}$$

Formula No. 5.

The powder fuze pointer 124 is actuated to represent functions of $t$, $h$ and $g$. Formula No. 6.

Figure 7:
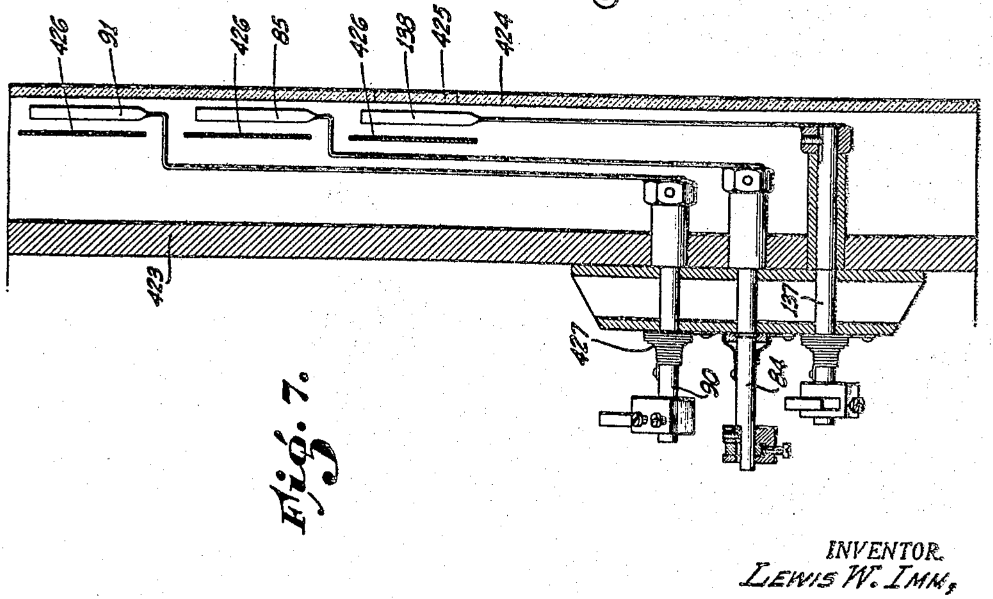
FIGURE 7 is an enlarged cross-sectional view on the line 7—7 of FIGURE 1, and with the slant range pointer rotated to its approximately eleven thousand yard position.

Casing: The computer consists of various parts, such as levers, racks, pinions and wires, all of which are mounted on a plate 423, FIGURE 7. It is provided with the front plate 424 through which extends the shafts for the various setting knobs. The front plate is also provided with various windows, through which the pointers may be read, and adjacent the windows are the various scales so as to enable the operator to readily read the values indicated by the pointers. The shafts on which the pointers are mounted extend through the plate 423. For instance, in FIGURE 7 are shown the shafts 137, 84 and 90 which are the shafts for the advance position angle balance pointer, the target position angle balance pointer and the slant range pointer, respectively. The advance position angle balance pointer 138 is secured to its shaft 137 and the upper end of this pointer is behind the window 425. A plate 426 is mounted behind the upper ends of the pointers and is provided with slots, through which extend the pointers 85 and 91. The pointer 85 is the target position angle balance pointer secured to the shaft 84, and the pointer 91 is the slant range pointer secured to the shaft 90. This plate 426 has indicia thereon to show what the pointer indicates such as that the pointer 91 denotes the slant range. Each of said shafts is provided with a spring 427 tending to turn the shaft, and its pointer to its zero position. The powder fuze setting pointer 124, the sight pointer 193 and the deflection setting pointer 368 have the same arrangement as just described. Obviously, side plates would be used to complete the casing, as well as a back plate, not shown, so as to exclude dust and to protect the working parts.

Figure 6:
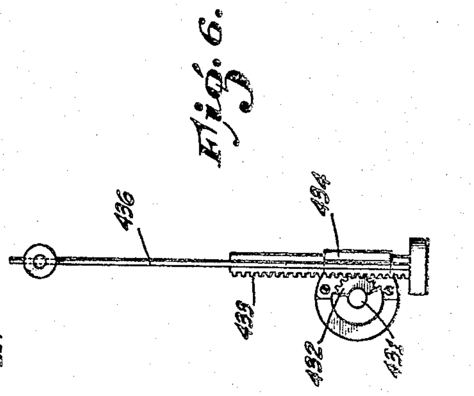
FIGURE 6 is an end view of FIGURE 5.
Figure 5:
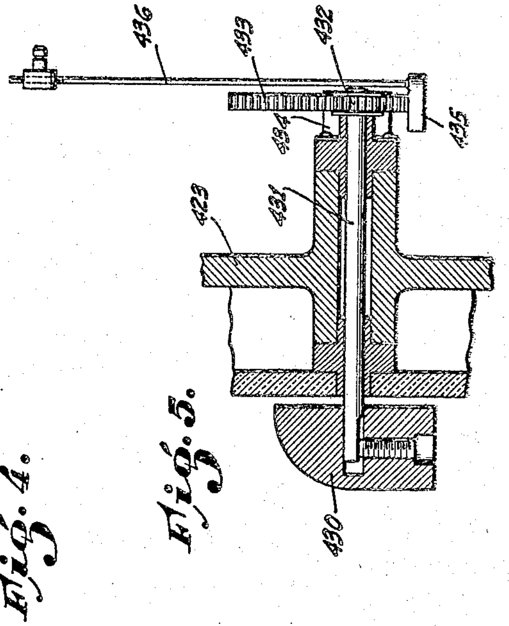
FIGURE 5 is an enlarged cross-sectional view of one of the item entering means and the parts immediately associated therewith.

The mechanism of the computer: All of the data is entered into the computer by operating the knobs 407 to 416, inclusive. The parts immediately actuated by these knobs are identical, and a general description may be given of one of them which will apply to all. As shown in FIGURES 5 and 6, a knob 430 is secured to a shaft 431, which has a bearing in the plate 423. Secured to the inner end of the shaft 431 is a pinion 432 which meshes with and drives a rack 433, which is held in engagement with the pinion by a guide clip 434. The rack is secured to a plate 435 from which extend one or more wires 436, which extend to various parts of the instrument.

*Preparation time knob 410 and barrage time knob 411*

The mathematical equations involved are as follows:

$$Rs=Vp\left(\frac{Tb}{2}+Tx+t\right)\left(\frac{\cos\frac{g+e}{2}}{\cos\frac{g-e}{2}}\right)+Vbt$$

$$\sin e\left\{Vp\left(\frac{Tb}{2}+Tx+t\right)\left(\frac{\cos\frac{g+e}{2}}{\cos\frac{g-e}{2}}\right)+Vbt\right\}-h=0$$

Figure 1:
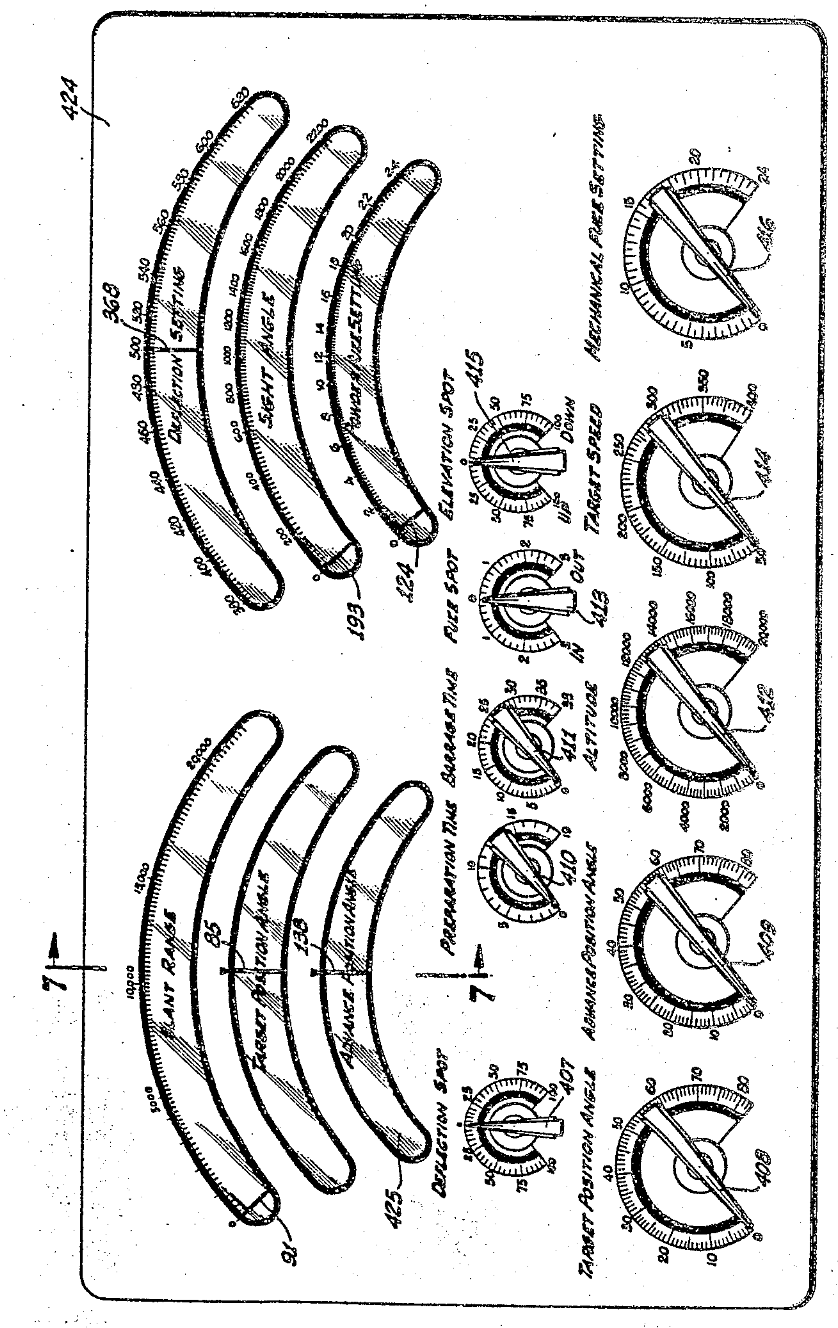
FIGURE 1 is a front elevational view of the computer.
Figure 9:
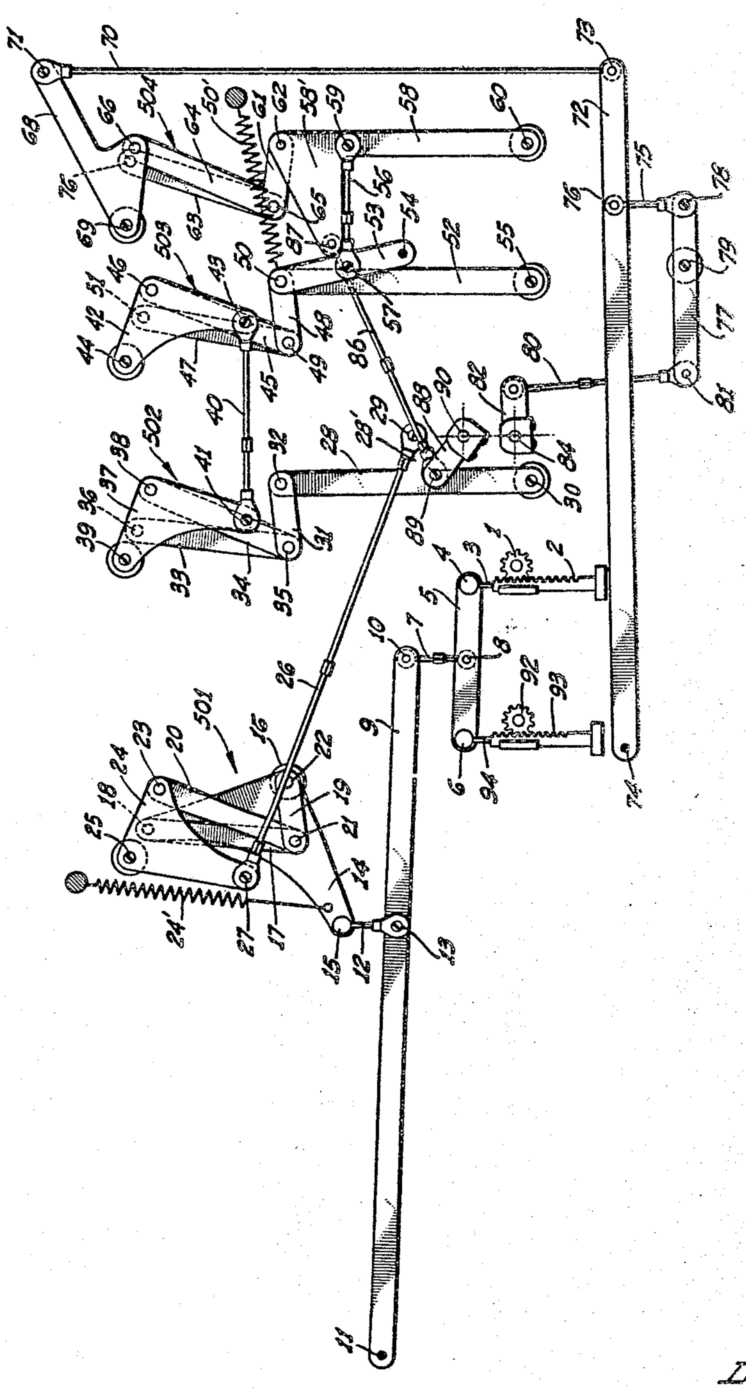
FIGURE 9 is a rear elevational view of the parts which are movable by the actuation of the barrage time knob and the preparation time knob.

The preparation time needed prior to actual firing on the enemy aircraft is first set in the preparation time knob 410, FIGURE 1. As shown in FIGURE 9, rotation of the preparation time knob 410 turns pinion 1 which moves rack 2 which carries wire 3. Wire 3 moves level 5 by means of pin 4. Lever 5 is pivoted on movable pin 6. The lever 5 is also actuated by the rotation of the barrage time knob 411. The knob 411 is secured to pinion 92 which actuates rack 93 which moves wire 94 connected to pin 6 of lever 5. The pin 6 may be considered as a fixed pivot for the lever 5 unless the barrage time knob 411 is actuated, and the pin 4 may be considered as a fixed pivot for lever 5 unless the preparation time knob 410 is actuated. The lever 5 may be considered as an addition lever to add the values set by the knob 411 to the values set by the knob 410.

As shown in FIGURE 1, the preparation time knob 410 is rotated twice as far as the barrage time knob 411 to enter a given number of seconds by each knob. Therefore, when the knob 411 is rotated from its zero to its 5 seconds position, its rack 93 will be moved only half as far as the rack 2 would be moved when the knob 410 is rotated from its zero to its 5 seconds position. By making the scales of knobs 410 and 411 to correct scale, the pin 8 is moved a distance corresponding to the value $$\frac{Tb}{2}+Tx$$

$Tb$ being the barrage time and $Tx$ being the preparation time in seconds.

The pin 8 carried by the midpoint of lever 5 actuates the wire 7 which is connected to lever 9 by means of pin 10. The lever 9 is pivoted on a movable pin 11 which may be raised or lowered by the actuation of the mechanical fuze setting knob 416, as will hereinafter be explained. Unless, however, the knob 416 is actuated, the pin 11 may be considered as a fixed pivot for the lever 9. When, however, the knob 416 is actuated it raises or lowers the pin 11, as will hereinafter be explained, thereby adding the value $t$ (mechanical fuze time) to the addition $$\frac{Tb}{2}+Tx$$

so that the pin 13 carried by the lever 9 moves a distance corresponding to $$\frac{Tb}{2}+Tx+t$$

The pin 13 actuates the wire 12 connected to the pin 15 carried by the triangular lever 14.

*First multiplying mechanism 501*

The triangular lever 14 is mounted on a fixed pivot stud 16 and at its upper end is provided with a pin 18 from which is suspended link 17. Link 17 carries at its lower end pin 21 which passes through the lower end of link 20 and the lefthand end of link 19. The other end of link 19 is mounted on pin 22 which is movable, as will hereinafter be described, by the actuation of the target speed knob 414, but unless the said knob 414 is actuated the pin 22 may be considered as a fixed pivot for the link 19. Link 20 is connected to bell crank lever 24 by means of pin 23, the lever 24 being mounted on a fixed pivot stud 25. A spring 24' is connected to lever 14 to take up any free play. Lever 24 carries pin 27 which actuates wire 26.

Figure 2:
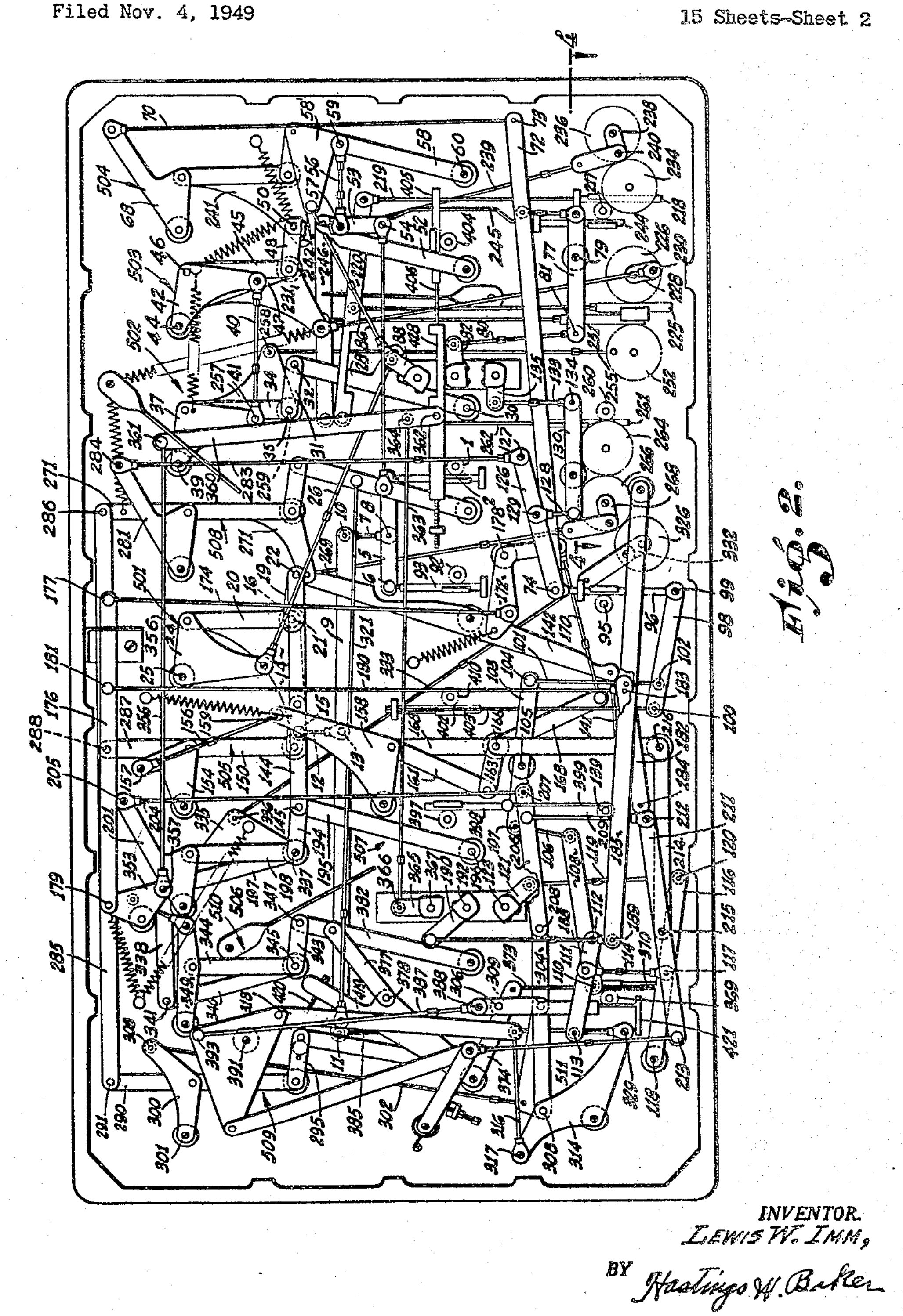
FIGURE 2 is a rear elevational view with the levers and links being shown in the positions corresponding to the zero setting of the various item entering knobs.
Figure 3:
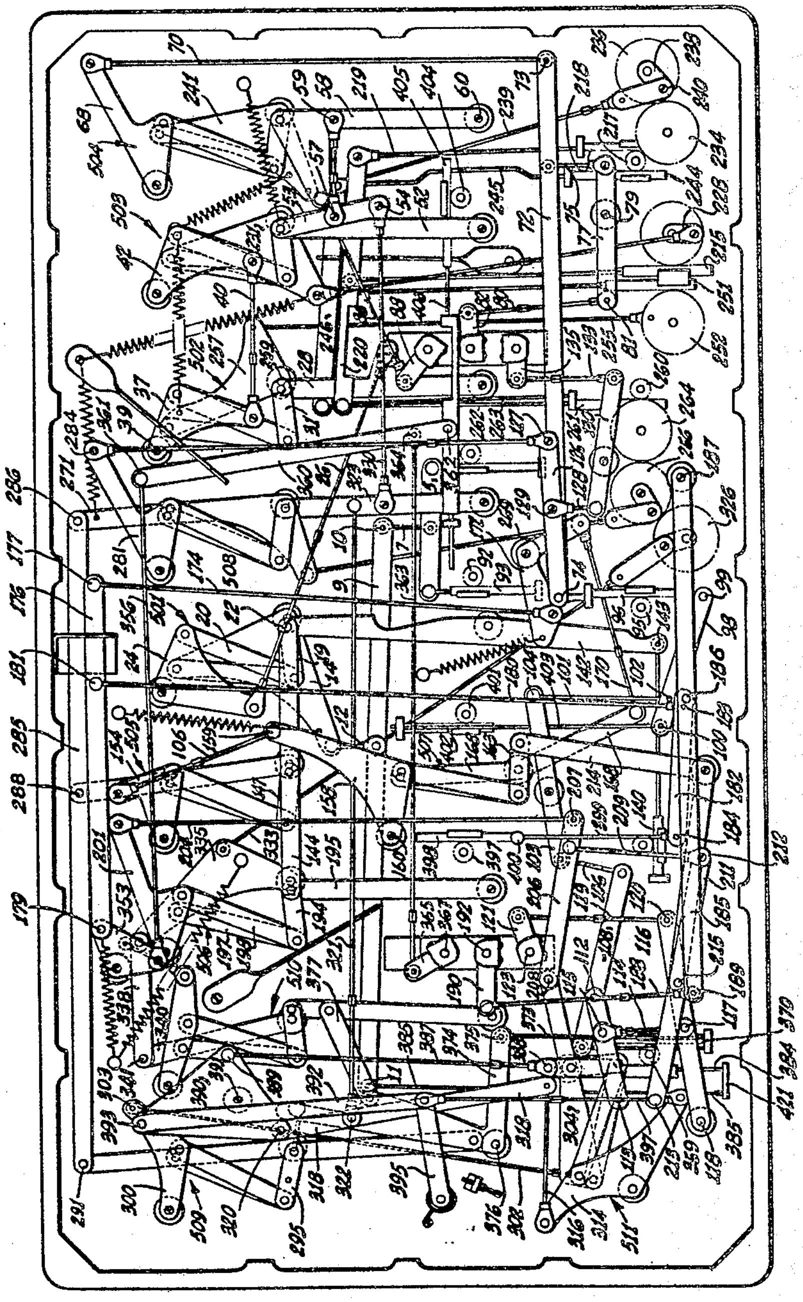
FIGURE 3 is a view similar to FIGURE 2, but showing the parts in their respective positions when items have been entered by the item entering knobs.

In FIGURE 2 the pin 21 connecting links 17, 19 and 20 is in axial alignment with the fixed stud 16 which forms a pivot for the lever 14. The links 17 and 20 are of equal length. Under these conditions movement of the lever 14 will not impart movement to lever 24 for the link 17 will simply turn on the pin 21. If, however, the target speed knob 414 is actuated, as will hereinafter be described, so as to move pin 22 and link 19 to the left or into the position shown in FIGURES 3 and 9, the pin 21 is moved out of alignment with stud 16. If now the lever 14 should be actuated, the link 17 will be raised or lowered, the pin 21 moving on an arc of a circle, having its center at pin 22 and a radius equal to the length of link 19 between the centers of pins 21 and 22. The link 20 will thus be raised or lowered, actuating the lever 24. The links 17, 19 and 20 and the levers 14 and 24, therefore, constitute a multiplying mechanism 501. It multiplies the value $Vp$ introduced by the target speed knob 414 through link 19 by the sum of the values introduced by the preparation time knob 410, the barrage time knob 411, and the mechanical fuze setting knob 416, so that this product will be $$Vp\left(\frac{Tb}{2}+Tx+t\right)$$

In like manner, when the racks 93 and 2 are in the elevated positions as shown in FIGURE 2, corresponding to the zero positions of the knobs 410 and 411 and with the pin 11 in its uppermost position as shown in FIGURE 2, the pins 18 and 23 will be in axial alignment with each other. If now the pin 22 and link 19 were moved to the right or left by the actuation of the target speed knob 413 to set in the value Vp the lever 24 would not be rotated, for $$\frac{Tb}{2}+Tx+t=\text{zero}$$

and Vp×zero=0. However, if the racks 93 and 2 are lowered as shown in FIGURE 9 by the rotation to a value of the preparation time knob 410 and the barrage time knob 411 and/or if the mechanical fuze setting knob 416 is set to represent a value, the lever 14 is rocked anticlockwise or into the position shown in FIGURE 9. When the racks 2 and 93 and the pin 11 are in their lowermost positions with the lever 14 in its adjusted position with the pins 18 and 23 out of alignment and with the lever 14 stationary, if the pin 22 will move to the right or left by the actuation of the target speed knob 414, as will hereinafter be described, the lever 24 will be rotated on its pivot stud 25 and the amount of the rotation depends upon the distance apart of the pins 18 and 23 multiplied by the movement of the pin 21. The distance apart of the pins 18 and 23 is controlled by the position of the addition lever 9 to add the value of the barrage time set by knob 411 to the value of the preparation time set by the knob 410 plus the value introduced by the pin 11 controlled by the mechanical fuze setting knob 416. The movement of the pin 27 of the lever 24 is, therefore, $$Vp\left(\frac{Tb}{2}+Tx+t\right)$$

which is the same value as described heretofore.

Wire 26 actuates an arm 28 by means of pin 29 carried by the projection or extension 28′ on the arm 28, with arm 28 pivoted on a fixed pivot 30. The wire 26 when in its zero position forms a right angle with the line from the center of pin 29 to the center of pivot 30.

*Second multiplying mechanism 502*

Arm 28 moves link 31 by means of pin 32. Link 31 carries pin 35 which passes through the lower ends of links 33 and 34. Link 33 is suspended from pin 36 secured by bell crank lever 257, FIGURES 2, 3, 8 and 13, which is controlled by the advance position angle knob 409 and the target position angle knob 408, as will hereinafter be described. Link 34 carries a pin 38 at its upper end which pin passes through bell crank lever 37, having a fixed pivot on stud 39. Lever 37 actuates wire 40 being connected thereto by pin 41.

As will hereinafter be explained, when the advance position angle knob 409 which enters the value of the angle ($g$) and the target position angle knob 408 which enters the value of the target position angle ($e$) are rotated so as to show their maximum possible settings, the lever 257 is rotated so as to bring pin 36 into substantial axial alignment with pin 38. Under such a condition the bell crank lever 37 would not be actuated regardless of how much the lever 28 should be moved. The reason for this is apparent for as the value of the angle $g+e$ approaches 90° so that $$\cos\frac{g+e}{2}$$

approaches or equals zero, we would be multiplying $$Vp\left(\frac{Tb}{2}+Tx+t\right)$$

by zero; but with the pins 36 and 38 spaced apart, which would be their positions when the target position angle knob 408 is in its 25° position and the advance position angle knob 409 is in its 13° position, movement of lever 28 moves pin 35 on an arc of a circle, having a center at pin 36 and a radius equal to link 33 so that the link 34 is raised or lowered actuating lever 37, pin 41, and wire 40. The movement apart of pins 36 and 38 enters the value $$\cos\frac{g+e}{2}$$

so that this second multiplying mechanism calculates $$Vp\left(\frac{Tb}{2}+Tx+t\right)\cos\frac{g+e}{2}$$

It will also be noted, as shown in FIGURE 2, that when the value of $$\frac{Tb}{2}+Tx+t=\text{zero}$$

i.e., when the barrage time knob which enters the value $$\frac{Tb}{2}$$

the preparation time knob which enters the value $Tx$, and the mechanical fuze setting knob which enters the value $t$ are in their zero positions, the pin 35 which connects the links 33 and 34 to the link 31 is in alignment with the pivot stud 259 of the bell crank lever 257. As mentioned above, rotation of the target position angle knob 408 and the advance position angle knob 409 rotates the lever 257 on its pivot stud 259. When the lever 257 is so rotated and if pin 35 is in alignment with pivot 259, no movement is imparted to lever 37, but when the pin 35 is out of alignment with the stud 257, as shown in FIGURE 9; i.e., when $$\frac{Tb}{2}+Tx+t$$

represents a value greater than zero, the above described multiplication results when the lever 257 is actuated.

*Third multiplying mechanism 503*

This multiplying mechanism is in fact a division mechanism. Wire 40 actuates bell crank lever 42 by means of pin 43, bell crank lever 42 being mounted on a fixed pivot stud 44. Lever 42 carries a pin 46 on which is mounted link 45. Link 45 carries at its lower end a pin 49 passing through links 47 and 48, with link 48 being pivoted on pin 50. A spring 50′ is connected to pin 50 so as to urge the pin 50 to the right to take up any free play. Link 47 carries at its upper end a pin 51 which is also carried by the bell crank lever 231, which enters the value $$\cos\frac{g-e}{2}$$

as will hereinafter be explained in connection with the target position angle knob 408 and the advance position angle knob 409 which knobs serve as a means to rotate the lever 231. Here again we have a multiplying mechanism which may be called the third multiplying mechanism, and which performs the function of dividing $$Vp\left(\frac{Tb}{2}+Tx+t\right)\cos\frac{g+e}{2}$$

by $$\cos\frac{g-e}{2}$$

Since the operation of this third multiplying mechanism is substantially the same as heretofore described, the detailed description is unnecessary.

The pin 50, carried by a link 48, passes through the upper ends of links 52 and 53, with link 52 being mounted on a fixed pivot stud 55, and the link 53 being mounted on a movable pin 54. The link 53 carries a pin 57 which actuates the wire 56. As will hereinafter be explained, in connection with the description of the advance position angle knob 409 and the mechanical fuze setting knob 416, the value of the average velocity of the projectile multiplied by time or $Vbt$ is a function of time and the sin of the angle ($g$) and the pin 54 is moved a distance by rotation of said knobs 409 and 416 so as to add $Vbt$ to the value introduced by the pin 50. The link 53 is therefore an addition lever to move the pin 57 a distance corresponding to the addition of $$Vp\left(\frac{Tb}{2}+Tx+t\right)\left(\frac{\cos\frac{g+e}{2}}{\cos\frac{g-e}{2}}\right) \text{ and } Vbt$$

Wire 56 moves arm 58 by means of pin 59, with arm 58 having a fixed pivot stud 60. Arm 58 is provided with a triangular extension 58′ which carries pin 87 connected to wire 86 and is also provided with a pin 62 which serves as a pivot for link 61. At this point the motion splits into two parts, one part following the link 61 and the other part following the wire 86. Following the split, as noted above, wire 86 moves pin 89 connecting wire 86 to the slant range arm 88. Arm 88 is secured to slant range shaft 90 which carries the slant range pointer 91, FIGURE 1. It is, therefore, apparent that the pointer 91 gives a direct reading of the solution of the problem $$Vp\left(\frac{Tb}{2}+Tx+t\right)\left(\frac{\cos\frac{g+e}{2}}{\cos\frac{g-e}{2}}\right)+Vbt$$

which is the slant range $Rs$. Formula No. 2 is therefore solved. In FIGURE 1 it will be noted that the scale for slant range is expressed in yards instead of feet, but this is a mere matter of calibration of the scale.

*Fourth multiplying mechanism 504*

Also following the split, link 61 moves pin 65 connecting link 61 to links 63 and 64. Link 64 carries at its upper end a pin 66 connected to lever 68 which is mounted on a fixed pivot stud 69. Link 63 carries at its upper end a pin 76 connected to lever 241 which is actuated by the target position angle 408, as will hereinafter be described. Lever 68 carries pin 71 which actuates wire 70. The target position angle knob 408 enters the value sin $e$ and this fourth multiplying mechanism moves the pin 71 and wire 70 so as to multiply sin $e$ by the slant range $Rs$ which is $$Vp\left(\frac{Tb}{2}+Tx+t\right)\left(\frac{\cos\frac{g+e}{2}}{\cos\frac{g-e}{2}}\right)+Vbt$$

but this product is equal to the altitude $h$. Therefore, the movement of the pin 71 and wire 70 represents the height of the plane. This fourth multiplying mechanism operates in the same manner as those heretofore described.

Wire 70 actuates lever 72 by means of pin 73 with lever 72 being mounted on movable pin 74. As will hereinafter be described, pin 74 is raised or lowered by the rotation of altitude knob 412, the pin 74 being in its lowermost position when the knob 412 is in its zero position and is elevated progressively as the knob 412 is rotated to indicate greater and greater heights. The pin 74 is, therefore, elevated as the heights increase while pin 73 is lowered as heights increase. The lever 72 might, therefore, be considered as a subtraction lever. The lever 72 carries pin 76 on which is hung wire 75 connected to pin 78 on lever 77, the lever 77 having a fixed pivot stud 79. The lefthand end of lever 77 carries pin 81 connected to wire 80 which is connected to pin 83 of arm 82 secured to shaft 84, to which is secured the target position angle balance pointer 85, FIGURE 1. This pointer is in balanced or zero position when it is in a vertical position or at the midpoint of its scale or when $$\sin e\left\{Vp\left(\frac{Tb}{2}+Tx+t\right)\left(\frac{\cos\frac{g+e}{2}}{\cos\frac{g-e}{2}}\right)+Vbt\right\}-h=0$$

Formula No. 3

The subtraction of $h$ from the remainder of the formula is accomplished on subtraction lever 72.

As will hereinafter be explained, the altitude is predetermined and the altitude knob 412 is rotated to represent the altitude of the plane, thereby corresponding to the moving of pin 74 upwardly. All of the values represented in the above calculation are first entered except the target position angle and the advance position angle, and the pointer 85 is then brought into its zero position by actuating simultaneously the advance position angle and the target position angle knobs.

Figures 10, 11:
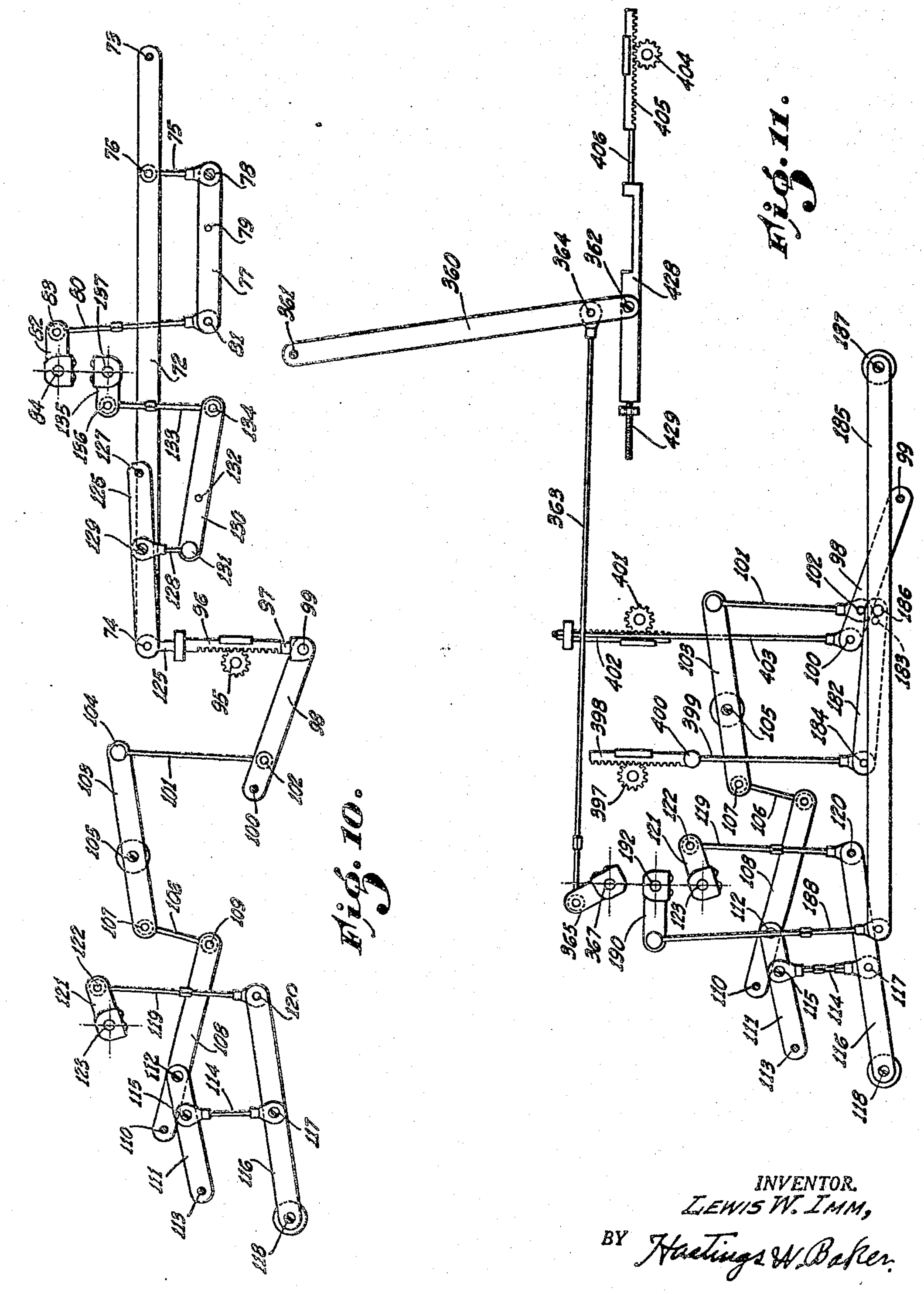
FIGURE 10 is a rear elevational view of the parts which are moved by the altitude knob.
FIGURE 11 is a rear elevational view of the parts movable by the actuation of the deflection spot knob, the powder fuze spot knob, and the elevation spot knob.

*Altitude knob 412 FIGURES 1 and 10 and powder fuze spot knob 413 FIGURES 1 and 11*

Upon sighting the enemy aircraft the predetermined altitude of said aircraft may be set into the computer through the manually controlled altitude knob 412, FIGURE 1. As shown in FIGURE 10, clockwise rotation of the altitude knob 412 operates pinion 95 which moves rack 96 carrying downwardly extending wire 97 and upwardly extending wire 125. At this point the motion splits into two parts, one part following wire 125 and one part following wire 97. Following the split, as noted above, wire 97 moves lever 98 by means of pin 99, with lever 98 being pivoted on a movable pin 100 which is raised or lowered by the powder fuze spot knob 413.

The powder fuze spot knob 413 is only used to correct undershooting or overshooting when a powder fuze is employed. If, for instance, the gunner found that he was overshooting and, therefore, desired his powder fuze to explode at a shorter interval of time, he would rotate the knob 413 clockwise an amount to correct the error. If he found that he was undershooting and, therefore, desired his powder fuze to explode at a larger interval of time, he would rotate the knob 413 anti-clockwise an amount to correct that error. The knob 413 actuates the pinion 401, FIGURE 11, which moves the rack 402 upwardly or downwardly, depending upon the direction of rotation of pinion 401. Rack 402 actuates wire 403 connected to pin 100 on lever 98. Lever 98 moves wire 101 through pin 102. The movement of pin 102 is, therefore, dependent on the values introduced by the movement of the powder fuze spot knob 413 and the altitude knob 412, and lever 98 may, therefore, be considered as an addition lever.

Wire 101 actuates pin 104 carried by lever 103, lever 103 having a fixed pivot on stud 105. Lever 103 at its other end carrier pin 107 on which is hung wire 106. Wire 106 is connected to lever 108 by means of pin 109, with lever 108 being pivoted on movable pin 110 which is raised or lowered by the movement of the mechanical fuze time knob 416, as will hereinafter be described, thereby adding the value $t$ to the addition given by lever 98. Lever 108 moves lever 111 through pin 112, with lever 111 being mounted on movable pin 113. As will hereinafter be described, the pin 113 is lowered when a value is set on the advance position angle knob 409 to enter the value of angle ($g$) and a value is entered on the mechanical fuze setting knob 416 to enter the value of ($t$). Lever 111 moves wire 114 through pin 115. Wire 114 moves lever 116 through pin 117, lever 116 having a fixed pivot on stud 18. Lever 116 moves wire 119 through pin 120. Wire 119 moves arm 121 through pin 122. Arm 121 is secured to the powder fuze time shaft 123, to which is also secured the powder fuze time pointer 124, FIGURE 1, which is therefore actuated to show the functions of $t$, $h$ and $g$. Formula No. 6.

It will be remembered that the altitude pinion 95 actuates wire 125 which carries pin 74 which passes through levers 72 and 126. Lever 72, as heretofore described, is pivoted on pin 73 and is raised or lowered by the operation of the barrage time knob 411, preparation time knob 410, target position angle knob 408, target speed knob 414, advance position angle knob 409, and the mechanical fuze setting knob 416.

It will also be remembered that the movement of the pin 73 solved the problem $$h=\sin e\left[Vp\left(\frac{Tb}{2}+Tx+t\right)\left(\frac{\cos\frac{g+e}{2}}{\cos\frac{g-e}{2}}\right)+Vbt\right]$$

Lever 72 is, as heretofore described, connected to arm 82 of the target position angle balance pointer 85 by means of pin 76, wire 75, pin 78, lever 77, pin 81, wire 80, and pin 83. In practice the altitude is predetermined and is entered by setting the altitude knob 412 and the other factors are then entered, moving the pin 73 so that the pointer 85 is in its center or balanced position, therefore, satisfying the equation $$\sin e\left[Vp\left(\frac{Tb}{2}+Tx+t\right)\left(\frac{\cos\frac{g+e}{2}}{\cos\frac{g-e}{2}}\right)+Vbt\right]-h=0$$

Formula No. 3

The lever 126 carries pin 127 which, as will hereinafter be described, is carried by the lower end of wire 283 (see FIG. 13) which is raised or lowered by the actuation of the advance position angle knob 409 to enter the value of sin *g* and the mechanical fuze setting knob 416 to enter the value *t*. The lever 126 carries pin 129 from which is suspended wire 128 connected to pin 131 carried by lever 130, having a fixed pivot on stud 132. The lever 130 carries pin 134 connected to wire 133 which is connected to arm 135 by means of pin 136. The arm 135 is secured to shaft 137 to which is affixed the advance position angle balance pointer 138.

The advance position angle balance pointer 138 is balanced in its mid or zero position when $$Vbt \sin g-h=\text{zero} \qquad \text{Formula No. 1}$$

Obviously the value of V*b* is a function of time and of sin *g*. The pin 74 is, therefore, elevated by rotating the altitude knob 412 to represent the predetermined altitude. The pin 127 is lowered by entering the proper values on the knobs 409 and 416 to enter the value *Vbt* sin *g*. The lever 126 is a subtraction lever solving the problem $$Vbt \sin g-h=\text{zero}$$

and balancing the pointer 138 at its mid or zero point.

Figure 12:
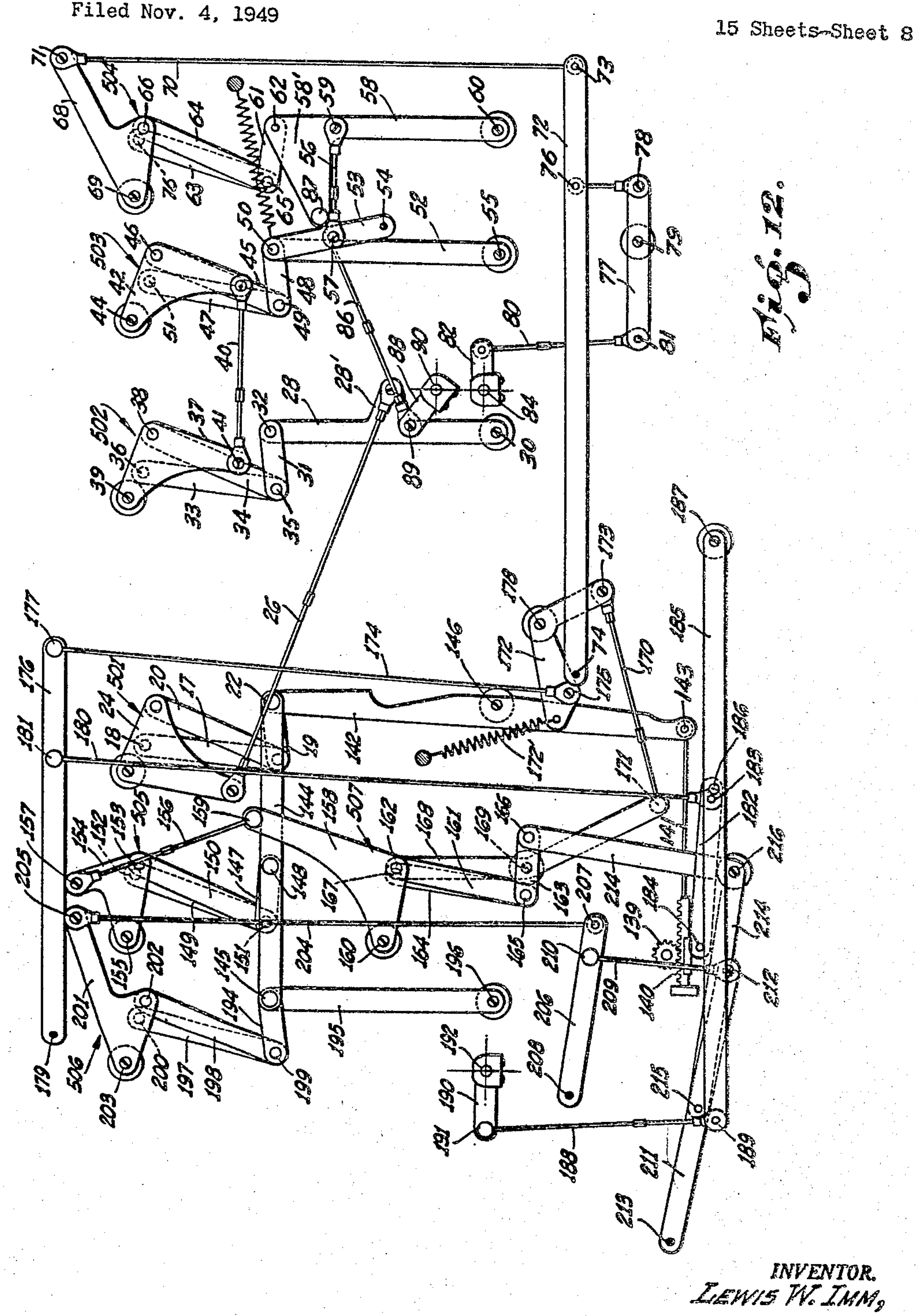
FIGURE 12 is a rear elevational view of the parts moved by the actuation of the target speed knob.

*Target speed knob 414, FIGURES 1 and 12*

The next factor to be set into the computer is the predetermined target speed which is introduced by manually turning the target speed knob 414, FIGURE 1. This knob 414 turns pinion 139 which moves rack 140 which carries wire 141. Wire 141 is connected to lever 142 by means of pin 143, with lever 142 having a fixed pivot on stud 146. Lever 142 carries pin 22 connected to links 144 and 19, with link 144 being pivoted on movable pin 145. At this point the motion splits into two parts, one part following link 19 and the other part following link 144.

As heretofore described, in connection with the preparation time knob 410 and the barrage time knob 411 shown in FIGURES 1 and 9, the movement of pin 22 multiplies $$Vp\left(\frac{Tb}{2}+Tx+t\right)$$

in the first multiplying mechanism, consisting of links 17, 19 and 20 and levers 14 and 24, and the resultant movement of wire 26 is transmitted through the second, third and fourth multiplying mechanisms, 502, 503 and 504, respectively, and through the subtraction mechanism 72 so that the resultant movement transmitted to the target position angle balance pointer 85 equals zero, so that the resultant movement will balance the target position angle balance pointer 85 in its mid or zero position or, in other words, to satisfy the equation $$\sin e\left[Vp\left(\frac{Tb}{2}+Tx+t\right)\left(\frac{\cos\frac{g+e}{2}}{\cos\frac{g-e}{2}}\right)+Vbt\right]-h=\text{zero}$$

Formula No. 3

Also, it will be remembered that the arm 58 which is actuated by the link 53 and wire 56 actuates the slant range pointer 91, and gives a direct reading of the solution of the problem $$Vp\left(\frac{Tb}{2}+Tx+t\right)\left(\frac{\cos\frac{g+e}{2}}{\cos\frac{g-e}{2}}\right)+Vbt \qquad \text{Formula No. 2}$$

In both of the above formulae the value V*p* or target speed is itnroduced by the actuation of the target speed knob 414.

Following the split, as above mentioned, link 144 (FIGURE 12) moves link 147 through pin 148 and moves links 194 and 195 through pin 145, with link 195 having a fixed pivot stud 196. At this point the motion divides into two parts, one part following link 147 and one part following link 194.

*Fifth multiplying mechanism 505*

The link 147 carries pin 151 which passes through the lower portion of links 149 and 150. The link 149 carries at its upper end a pin 152 which passes through a lever 287 (FIGURE 13) which is actuated by the advance position angle knob, as will hereinafter be described, to enter the value sin *g*. The link 150 carries at its upper end a pin 153 which is connected to the bell crank lever 154 mounted on a fixed pivot stud 155. The lever 154 also carries a pin 157 from which is suspended the wire 156. This fifth multiplying mechanism 505 operates in substantially the same manner as the multiplying mechanism heretofore described, and its function is to multiply V*p* by sin *g*, the value of V*p* being entered by lever 287 so that the wire 156 moves an extent corresponding to *Vp* sin *g*.

*Sixth multiplying mechanism 506*

Following the split noted above, link 194 carries pin 199 which passes through the lower ends of links 197 and 198. Link 197 carries a pin 200 mounted on lever 335 (FIGURE 13) controlled by the advance position angle knob 409. Link 198 carries pin 202 mounted on lever 201, which lever 201 is mounted on fixed pivot pin 203. The lever 201 is provided with a pin 205 on which is hung wire 204. This sixth multiplying mechanism 506, therefore, performs the function of multiplying V*p*, which is entered by the movement of the link 194 by cos *g*, cos *g* being entered by the movement of lever 335 so that wire 204 moves an extent corresponding to *Vp* cos *g*.

The lower end of the wire 204 is connected to lever 206 by means of pin 207. The pin 207, therefore, moves according to the value V*p* cos *g* entered by the sixth multiplying mechanism. The link 206 is pivoted on pin 208 which is controlled by the advance position angle knob 409 and the mechanical fuze time knob 416, as will hereinafter be described.

The velocity of the projectile or V*b* is a function of *t*, as well as a function of *g*. The movement of pin 208 enters the function of *t* and *g* and the link 206 is an addition lever which adds the function of $t$ and $g$ to the value $Vp \cos g$. The link 206 carries pin 210 on which is hung the wire 209 which carries at its lower end a pin 212 secured to one end of lever 211 which at its other end is pivoted on a pin 213. The pin 213 is raised or lowered by the rotation of the mechanical fuze time knob 416, as will hereinafter be described. The other function of $t$ is, therefore, entered by the movement of pin 213. The lever 211 is an addition lever which adds the function of $t$ to the movement imparted to the said lever by the wire 209, so that the pin 215 carried by the lever 211 moves a value corresponding to $Vb+Vp \cos g$. The pin 215 carried by the lever 211 passes through one end of a bell crank lever 214 mounted on a fixed pivot stud 216. The lever 214 carries at its upper end a pin 166 on which is mounted a link 163 so that this link 163 moves a distance corresponding to $Vb+Vp \cos g$.

*Seventh multiplying mechanism 507*

The wire 156 (FIGURE 12), it will be remembered, moves a distance corresponding to the value $Vp \sin g$. The wire 156 carries at its lower end a pin 159 secured to bell crank lever 158, which is mounted on fixed stud 160. The lever 158 carries pin 162 from which is suspended the link 161. The link 161 carries at its lower end a pin 165 which also passes through links 163 and 164. The upper end of link 164 carries a pin 167 which passes through the upper end of lever 168 which is mounted on a fixed pivot stud 169. At its lower end it carries a pin 171 connected to wire 170. It will be remembered that the lever 214 is actuated by pin 215 to enter the value $Vb+Vp \cos g$, and that pin 159 was moved a distance corresponding to $Vp \sin g$. This seventh multiplying mechanism 507 performs in reality a division to divide $Vp \sin g$ by $Vb+Vp \cos g$ or multiplies $Vp \sin g$, which was the resultant of the fifth multiplying mechanism, by $$\frac{1}{Vb+Vp \cos g}$$

The wire 170 carries pin 173 connected to one end of bell crank lever 172 which is mounted on fixed stud 178, a spring 172' being secured to one end of this lever to eliminate any free play. The function of this lever 172 is to convert the expression $$\frac{Vp \sin g}{Vb+Vp \cos g}$$

into the expression $$\tan^{-1}\left(\frac{Vp \sin g}{Vb+Vp \cos g}\right)$$

The lever 172 carries pin 175 secured to the lower end of wire 174 which extends to pin 177 carried by lever 176 mounted on a pin 179 carried by a lever 353 actuated by the advance position angle knob 409 and the mechanical fuze knob 416, as will hereinafter be described. Obviously the angle ($a$) is a function of time and cosine of the angle ($g$). The movement of the pin 179, therefore, enters the value of the angle ($a$) and the lever 176 is an addition lever, so that the movement of the pin 181 corresponds to $$a+\tan^{-1}\left(\frac{Vp \sin g}{Vb+Vp \cos g}\right)$$

lever 176 accomplishing this addition. A wire 180 extends from the pin 181 to a pin 183 of the bar 182, the other end of which is pivoted on the pin 184, which may be raised or lowered by the actuation of the elevation spot knob 415. The bar 182 carries at its right-hand end a pin 186, secured to lever 185 mounted on fixed pivot stud 187. The pin 184 is, therefore, raised or lowered to introduce the value entered by the elevation spot knob 415. The bar 182 is an addition lever and performs the function of adding $$a+\tan^{-1}\left(\frac{Vp \sin g}{Vb+Vp \cos g}\right)$$

to elevation spot. The lever 185 carries at its left-hand end a pin 189 connected to wire 188 which is connected to the pin 191 of the arm 190 secured to the shaft 192 which also has secured thereto sight angle pointer 193, FIGURE 1. This sight angle pointer is, therefore, actuated to give a direct reading of the solution of $$a+\tan^{-1}\left(\frac{Vp \sin g}{Vb+Vp \cos g}\right) + \text{elevation spot}$$

Formula No. 5

*Target position angle knob*

Figure 8:
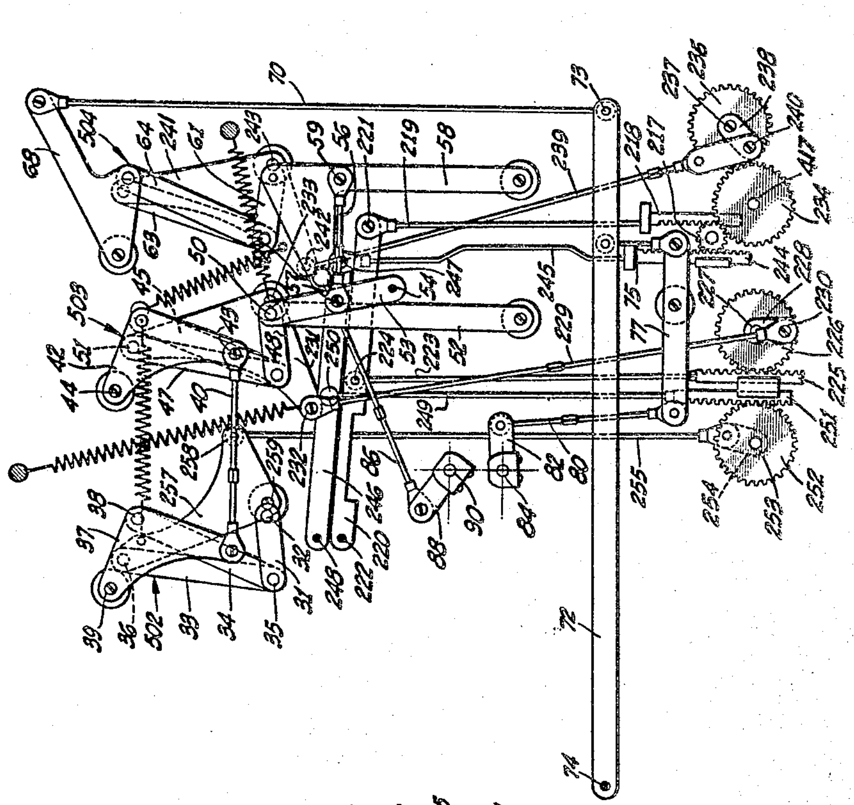
FIGURE 8 is a rear elevational view of the parts which are movable by the actuation of the target position angle knob.

The next factor to be set into the computer is the target position angle which is introduced into the computer by manually turning the target position angle knob 408 which operates the parts shown in FIGURE 8, so as to actuate the slant range pointer 91 to visually indicate the slant range or $R_s$ by the solution of the formula $$R_S=Vp\left(\frac{Tb}{2}+Tx+t\right)\left(\frac{\cos\frac{g+e}{2}}{\cos\frac{g-e}{2}}\right)+Vbt$$

Formula No. 2

It also actuates the target position angle balance pointer 85 to solve the formula $$\sin e\left\{Vp\left(\frac{Tb}{2}+Tx+t\right)\left(\frac{\cos\frac{g+e}{2}}{\cos\frac{g-e}{2}}\right)+Vbt\right\}-h=0$$

Formula No. 3

As shown in FIGURES 1 and 8, rotation of the target position angle knob 408 rotates the pinion 217 which meshes with and drives the rack 218, pinion 234, and rack 244. At this point the motion splits into three parts, one part following rack 218, one part following pinion 234, and one part following rack 244.

The rack 244 carries wire 245 connected to pin 247 of lever 246 which lever is mounted on pin 248 which is moved by the actuation of the advance position angle knob 409, as will hereinafter be explained. Both pins 248 and 247 are lowered as increased values are entered for ($g$) and ($e$) by the setting of the setting knobs respectively. The lever 246 is, therefore, an addition lever which imparts to its center pin 250 the value $$\frac{g+e}{2}$$

The pin 250 carries wire 249 which is attached to rack 251 which meshes with and drives pinion 252 about its shaft 253. Crank arm 254 is secured to pinion 252 and carries crank pin 256, which is connected to the lower end of wire 255. When $$\frac{g+e}{2}=0$$

that is when $g=e$, crank arm 254 is in alignment with wire 255 and, therefore, serves as a means to convert the values $$\frac{g+e}{2} \text{ into } \cos\frac{g+e}{2}$$

Wire 255 carries at its upper end pin 258 secured to lever 257, with lever 257 being mounted on a fixed pivot stud 259. Lever 257 moves link 33 by means of pin 36.

It will be remembered that lever 257 and link 33 are a part of the second multiplying mechanism 502, consisting of links 31, 33 and 34, and levers 37 and 257. It will also be remembered that link 31 enters the value $$Vp\left(\frac{Tb}{2}+Tx+t\right)$$

and, as just described, the pin 258 enters the value $$\cos\frac{g+e}{2}$$

This second multiplying mechanism, 502, multiplies these two values so as to give an output value of $$Vp\left(\frac{Tb}{2}+Tx+t\right)\left(\cos\frac{g+e}{2}\right)$$

and this output value is transmitted to the pin 43 of the third multiplying mechanism, 503, by the wire 40. The rack 218 which is driven by the pinion 217 carries wire 219 connected to lever 220 by means of pin 221. The lever 220 is pivoted on pin 222, which pin is controlled by the advance position angle knob 409. The value of angle ($e$) is, therefore, entered by the movement of pin 221 and the value of ($g$) is entered by the movement of pin 222. However, pin 222 moves downwardly as the value of ($g$) increases and the pin 221 moves upwardly as the value of ($e$) increases, so that lever 220 is a subtraction lever which moves its center pin 224 a value corresponding to $$\frac{g-e}{2}$$

Wire 223 is suspended from pin 224 and at its lower end is provided with a rack 225 which meshes with and drives a pinion 226 about its shaft 227. A crank arm 228 is secured to pinion 226 and the crank arm is provided with crank pin 230 connected to wire 229. The wire 229 is in alignment with the crank arm 228 when the value entered for $g-e$ equals zero, and this mechanism converts the value $$\frac{g-e}{2}\text{ to }\cos\frac{g-e}{2}$$

Wire 229 is connected to pin 232 which is secured to lever 231, lever 231 being mounted on a fixed pivot stud 233. Lever 231 carries pin 51 on which is mounted link 47. It will be remembered that lever 231 is a part of the third multiplying mechanism, 503, consisting of links 48, 47 and 45, and levers 42 and 231. The value $$\cos\frac{g-e}{2}$$

is entered into this third multiplying mechanism, 503, by the movement of pin 232. It will also be remembered that the pin 43 imparts an input value of $$Vp\left(\frac{Tb}{2}+Tx+t\right)\left(\cos\frac{g+e}{2}\right)$$

This third multiplying mechanism might be called a division mechanism for it multiplies the input of pin 43 by the inversion of the input at pin 232, thereby obtaining the output value of $$Vp\left(\frac{Tb}{2}+Tx+t\right)\left(\frac{\cos\frac{g+e}{2}}{\cos\frac{g-e}{2}}\right)$$

which output value is transmitted to pin 50 of link 53 by means of link 48. As heretofore explained, the link 53 is an addition lever which adds the value of $Vbt$ introduced at pin 54 to $$Vp\left(\frac{Tb}{2}+Tx+t\right)\left(\frac{\cos\frac{g+e}{2}}{\cos\frac{g-e}{2}}\right)$$

which latter value is introduced at pin 50, and this sum is imparted to arm 58 by means of wire 56 and to slant range pointer 91 by wire 86 and arm 88, so that the slant range pointer gives a direct reading of the solution of the problem $$Vp\left(\frac{Tb}{2}+Tx+t\right)\left(\frac{\cos\frac{g+e}{2}}{\cos\frac{g-e}{2}}\right)+Vbt$$

Formula No. 2

It will also be remembered that arm 58 actuates link 61 which is a part of the fourth multiplying mechanism, 504, consisting of links 61, 63 and 64, and levers 68 and 241.

Figure 4:
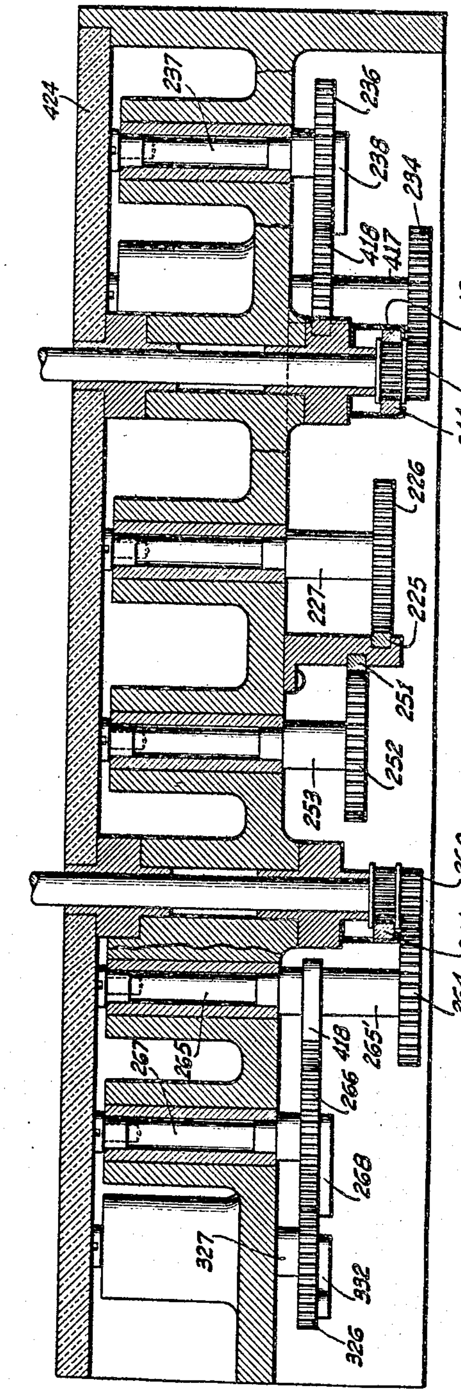
FIGURE 4 is an enlarged cross-sectional plan view on the line 4—4 of FIGURE 2.

As above mentioned, the pinion 217 actuates pinion 234, FIGURES 4 and 8. The pinion 234 is secured to a shaft 417 to which is secured pinion 418 which meshes with and drives pinion 236 about its shaft 237. Secured to pinion 236 is a crank arm 238 carrying crank pin 240 connected to wire 239. Wire 239 moves lever 241 by means of pin 242, with arm 241 having a fixed pivot on stud 243. Attention is called to the fact that when the target position angle knob 408 is at its zero position, the crank arm 238 is at substantially a right angle to wire 239 so that the motion imparted to pin 242 corresponds to sin $e$.

This fourth multiplying mechanism, 504, therefore, multiplies $$Vp\left(\frac{Tb}{2}+Tx+t\right)\left(\frac{\cos\frac{g+e}{2}}{\cos\frac{g-e}{2}}\right)+Vbt$$

which value is introduced through link 61 by sin $e$, which value is introduced through pin 242, and it is this output value that is transmitted to wire 70 and pin 73 of the lever 72. It will also be remembered that the altitude is transmitted to the lever 72 by the altitude knob 412 through pin 74 and the lever 72 subtracts the value ($h$) entered through pin 74 from the value $$\sin e\left\{Vp\left(\frac{Tb}{2}+Tx+t\right)\left(\frac{\cos\frac{g+e}{2}}{\cos\frac{g-e}{2}}\right)+Vbt\right\}$$

which latter value is ($h$). Formula No. 3. The lever 72 is connected to target position angle balance pointer 85 by wire 75, lever 77, wire 80, and arm 82, so that the pointer 85 balances in its zero or midposition when the ($h$) introduced through the pin 73 equals the value of ($h$), which has been introduced by the movement of pin 74.

Figure 13:
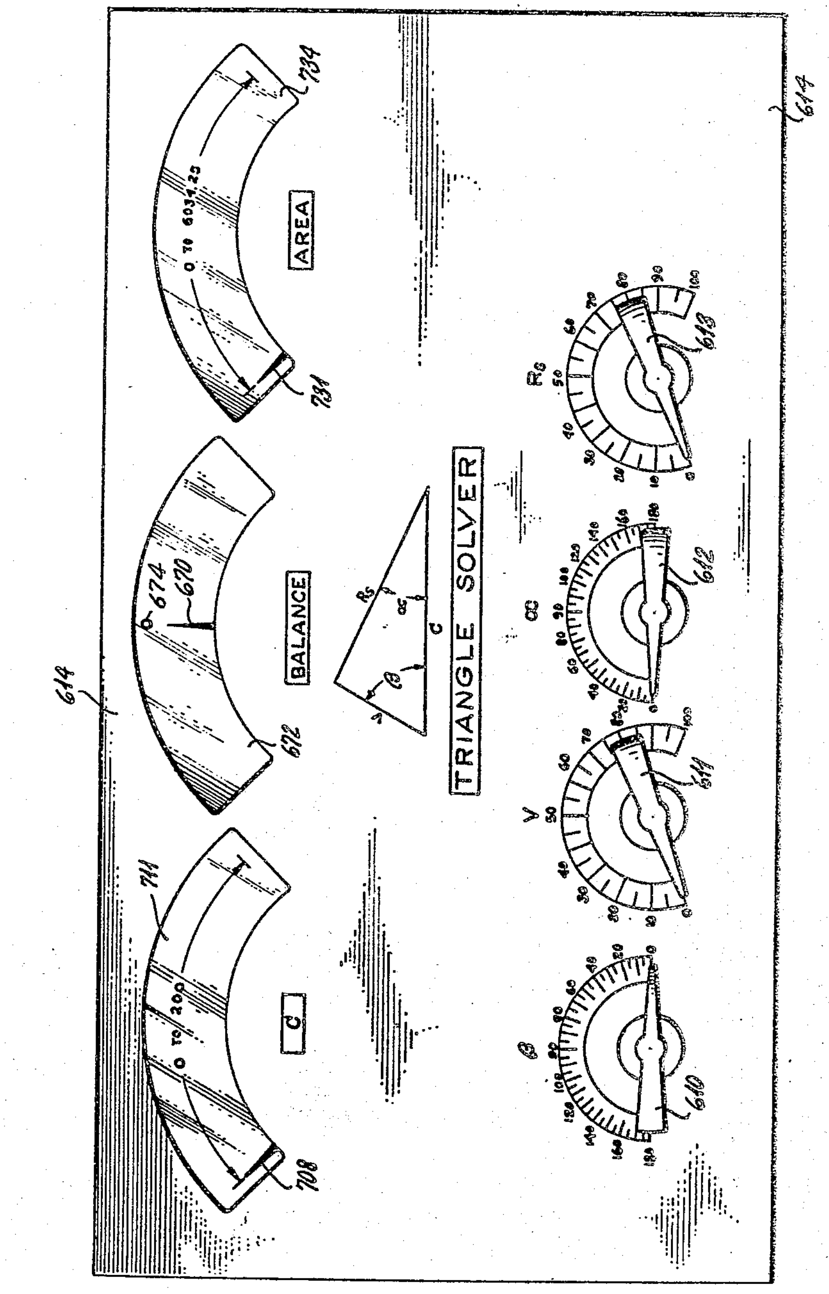
FIGURE 13 is a rear elevational view of the parts actuated by the advance position angle knob.
Figure 13:
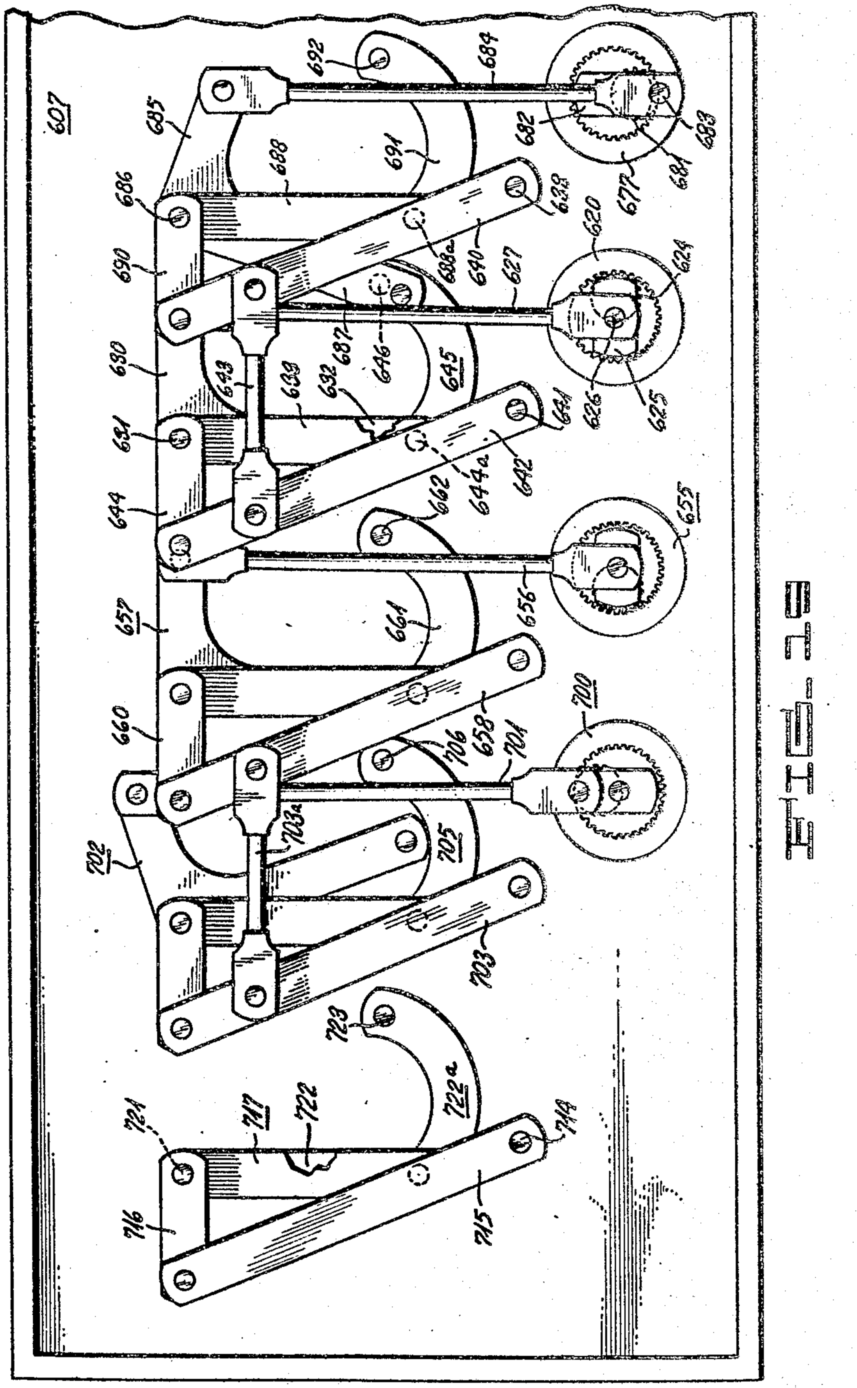

*Advance position angle knob, FIGURES 1 and 13*

The next factor to be set into the computer is the advance position angle which is introduced into the computer by manually turning the advance position angle knob 409. Clockwise rotation of this knob rotates the pinion 260 which moves rack 261 and rotates pinion 264 about its shaft 265. At this point the motion divides into two parts, one part following rack 261 and one part following pinion 264. The rack 261 carries wires 262 and 263. At this point the motion divides again into two parts, one part following wire 262 and one part following wire 263.

Wire 263 moves lever 246 by means of pin 248, the lever 246 being pivoted on pin 247, FIGURE 8. It will be remembered that the center pin 250 of lever 246 actuates wire 249, rack 251, pinion 252, wire 255, and lever 257 of the second multiplying mechanism, 502, the output of which is transmitted to the third multiplying mechanism, 503, by means of wire 40.

Wire 262 is attached to pin 222 of lever 220, lever 220 being pivoted on pin 221, as heretofore described in connection with the description of the target position angle knob 408. The motion imparted to pin 224 of lever 220 is transmitted to rack 225, pinion 226, and wire 229, thence through the third multiplying mechanism, 503, which, it will be remembered, receives the output from the second multiplying mechanism, 502, and thence, through link 53, arm 58, wire 86, and arm 88 to actuate the slant range pointer 91 to indicate the solution of the problem $$Rs=Vp\left(\frac{Tb}{2}+Tx+t\right)\left(\frac{\cos\frac{g+e}{2}}{\cos\frac{g-e}{2}}\right)+Vbt$$

Formula No. 2

Also, it will be remembered that the arm 58 actuates the fourth multiplying mechanism, 504, and the motion is transmitted therefrom through lever 72, wire 75, lever 77, wire 80, and arm 82 to the target position angle balance pointer 85 to balance it in its zero position when $$\sin e\left\{Vp\left(\frac{Tb}{2}+Tx+t\right)\left(\frac{\cos\frac{g+e}{2}}{\cos\frac{g-e}{2}}\right)+Vbt\right\}-h=\text{zero}$$

The pinion 264 is secured to sleeve 265', to which is secured segmental gear 418 which meshes with and drives pinion 266 about its shaft 267. Pinion 266 meshes with and drives pinion 326 on its shaft 327. A crank arm 268 is secured to pinion 266. At this point the motion splits into two parts, one part following pinion 326 and one part following crank pin 270 on crank arm 268.

Crank pin 270 is secured to wire 269 which is connected to pin 272 mounted on lever 271 pivoted to a fixed stud 273, and which lever 271 extends upwardly carrying pin 286 at its upper end. A spring 271' is attached to the lever 271 to take up any free motion. The value of angle $g$ is entered by the rotation of knob 409 and this is converted to sin $g$ by means of crank 268, the crank 268 forming substantially a right angle with wire 269 when the advance position angle knob is in its zero position. The pin 272, therefore, enters the value sin $g$.

*Eighth multiplying mechanism 508*

Lever 271 carries pin 275 connected to link 274 which carries pin 278 which is connected to links 276 and 277. Link 277 carries pin 280 secured to lever 281 pivoted on fixed stud 282, and which lever 281 carries the output pin 284 secured to wire 283. As heretofore explained, the pin 272 enters the value sin $g$. As will hereinafter be explained, the motion of $Vbt$ is given to the link 276 by the actuation of the advance position angle knob 409 and mechanical fuze setting knob 416 so that the output pin 284 moves a distance representing the value $Vbt$ sin $g$. Wire 283 carries pin 127 which, it will be remembered, is connected to one end of subtraction lever 126, while the other end of lever 126 is actuated by the altitude knob through pin 74, thereby balancing the advance position angle balance pointer 138 in its midpoint when $$Vbt\sin g-h=\text{zero}$$

this motion being transmitted from lever 126 to the pointer 138 by means of wire 128, lever 130, wire 133, and arm 135.

The pin 286 connects the lever 271 to link 285. The link 285 carries pins 288 and 291. A lever 287 is connected to link 285 by means of the pin 288, the lever 287 being pivoted on a fixed stud 289. The pin 291 is connected to lever 290 mounted on fixed stud 292. At this point the motion divides into two parts, one part following lever 287 and one part following lever 290. It will be remembered in the description of the fifth multiplying mechanism, 505, which was described in connection with the target speed mechanism, that the lever 287 was a part of said fifth multiplying mechanism, and it is this lever 287 that enters the value sin $g$ through pin 152 and link 149 in said fifth multiplying mechanism while the pin 157 enters the value $Vp$. The said fifth multiplying mechanism multiplies these values and moves the output pin 157, wire 156, and pin 159 a value corresponding to a value $Vp$ sin $g$, which motion is transmitted to the seventh multiplying mechanism through lever 158.

*Ninth multiplying mechanism*

It will be remembered that lever 290 is shifting by lever 271 through link 285 to enter the value sin $g$. Lever 290 mounted on stud 292 carries pin 294 connected to link 293. Link 293 carries at its lower end a pin 297 connected to links 295 (FIGURE 14) and 296. Link 296 carries at its upper end a pin 299, which pin is carried by lever 300 which is mounted on a fixed stud 301.

As will hereinafter be described, the mechanical fuze setting knob 416 moves the link 295 so that this ninth multiplying mechanism, 509, multiplies sin $g$ by the function of time entered through link 295, and this proudct is transmitted by lever 300 to pin 303, and thence from wire 302 to pin 305 carried by lever 304, which is mounted on fixed stud 306. The other end of lever 304 carries the pin 208 which enters the functions of $t$ and $g$ to the movement of lever 206. As heretofore explained just after the description of the sixth multiplying mechanism, the pin 207 enters the value $Vp$ cos $g$. The pin 210 of lever 206, therefore, moves the pin 212 of lever 211 $Vp$ cos $g$ plus a function of $t$ and $g$.

The lever 211 is also actuated by pin 213 controlled by the mechanical fuze setting knob 416, as will hereinafter be described, and which enters a function of $t$. The addition lever 211 adds the function of $t$ introduced at pin 213 to the value of $Vp$ cos $g$ plus a function of $t$ and $g$ introduced at pin 212. As heretofore explained, however, $Vb$ is a function of $t$, as well as a function of $t$ and $g$, so that pin 215 of lever 211 moves a distance corresponding to $Vb+Vp$ cos $g$, and this motion is transmitted through lever 214 to the seventh multiplying mechanism, 507, so that the output transmitted to lever 168 is $$\frac{Vp\sin g}{Vb+Vp\cos g}$$

which motion is transmitted to lever 172, which converts this value into $$\tan^{-1}\left(\frac{Vp\sin g}{Vb+Vp\cos g}\right)$$

It will also be remembered that lever 172 actuates lever 176 by wire 174 and that lever 176 is mounted on pin 179 carried by lever 353. As will presently be described, the value of angle $a$ is entered through lever 353. Secured to pinion 326 is a crank arm 332 carrying crank pin 334 connected to wire 333 which is connected to lever 335 of the sixth multiplying mechanism, 506, by pin 336, the lever 335 being pivoted on fixed stud 337 thereby entering the value cos $g$ into said sixth multiplying mechanism. The lever 335 is connected to link 338 by means of pin 339.

*Tenth multiplying mechanism 510*

The link 338 carries a pin 341 connected to lever 340 mounted on a fixed stud 346. The lever 340 carries a pin 419 which carries link 342. Link 342 carries pin 345 connected to links 343 and 344 pivoted on pins 347 and 348, respectively. Pin 347 is moved by the mechanical fuze setting knob 416 to enter a function of ($t$), as will hereinafter be described, while the link 338 enters the value cos $g$. Pin 348 is connected to lever 349 mounted on fixed stud 350, and at its righthand end carries pin 352 connected to wire 351, which in turn is connected to pin 354 of the lever 353. The pin 352, therefore, enters a value of a function of ($t$) multiplied by cos $g$ while the lever 353 converts this into a different function of $t \times \cos g$ which is the value of angle $a$.

The lever 353 is connected to link 176 by means of pin 179 so as to move the lefthand end of lever 176 upwardly or downwardly to enter the value of the angle ($a$) and, as described above, the lever 176 is an addition lever to add the value of angle ($a$) to $$\tan^{-1}\left(\frac{Vp \sin g}{Vb+Vp \cos g}\right)$$

and this sum is transmitted to pin 183 of lever 182 by means of pin 181 and wire 180 for the sight angle pointer 193.

The movable pin 184 of the lever 182 introduces the value of elevation spot and the lever 182 adds elevation spot to $$a+\tan^{-1}\left(\frac{Vp \sin g}{Vb+Vp \cos g}\right)$$

and this sum is transmitted by pin 186 to lever 185, wire 188, and arm 190 of the sight angle pointer 193. As heretofore explained, the conversion from knots to hours and from feet to seconds converts the above formula to $$\text{sight angle}=a+\tan^{-1}\left(\frac{1.689\ Vp \sin g}{Vb+1.689\ Vp \cos g}\right) + \text{elevation spot} \quad \text{Formula No. 5}$$

But this conversion is made by levers. The lever 353 is also connected to wire 356 by means of pin 357. Wire 356 is connected to lever 360 by pin 361. The lower end of lever 360 carries pin 362, which is shifted horizontally by the rotation of the deflection spot knob 407, as will hereinafter be described. The lever 360 carries pin 364 connected to wire 363. The pin 364 and wire 363 are, therefore, actuated an amount corresponding to the value of angle ($a$) plus deflection spot, and this value is transmitted to the pointer 368 on shaft 367 by arm 365 actuated by wire 363 and pin 366.

*Eleventh multiplying mechanism 511*

The lever 304 (FIGURES 13 and 14) carriers a pin 308 on which is pivoted link 307 which at its other end carries pin 311 connected to links 309 and 310. Link 309 is raised or lowered by the mechanical fuze time knob 416, as will hereinafter be described, to enter a function of $t$. The link 310 carries pin 313 connected to lever 314 mounted on fixed stud 315. The lever 314 carries a pin 317 connected to wire 316 and a pin 329 connected to wire 328 which is hung on pin 113 of lever 111. This eleventh multiplying mechanism 511, therefore, multiplies the function of $t$ and $g$ by a function of $t$.

It will be remembered that the lever 111 is pivoted on a movable pin 112 which is actuated by the setting of the altitude and the powder fuze spot knobs, so that this lever 111 gives an output at pin 115 of a function of $t$, $h$, and $g$, which value is transmitted to the powder fuze setting pointer 124 by means of wire 114, lever 116, wire 119, and arm 121, thereby actuating the powder fuze setting pointer 124 to indicate the function of $t$, $h$, and $g$. Formula No. 6.

It will be remembered that lever 314 also actuates pin 317 and wire 316, which wire 316 is connected to pin 319 of lever 318 thereby actuating said lever an amount corresponding to a function of $t$ and $g$. The pin 320 of said lever 318 is actuated an amount corresponding to $t$ as will hereinafter be described. The pin 322 of lever 318 is, therefore, actuated so as to add the function of $t$ to a function of $t$ and $g$, which value is $Vbt$ and which motion is transmitted by wire 321 to pin 324 of lever 323, lever 323 being pivoted on a fixed pivot stud 325.

Lever 323 moves link 276 by means of pin 279 and moves wire 330 by means of pin 331. Wire 330 is connected to pin 54 of link 53.

It will be remembered that it is the link 276 that introduces the value of $Vbt$ into the eighth multiplying mechanism, 508, which value is also transmitted to the pin 54 which introduces this value into the addition link 53. It will also be remembered that the said eighth multiplying mechanism multiplies the value sin $g$ introduced through pin 272 by $Vbt$ introduced through link 276, and that this product was transferred to the advance position angle balance pointer 138 through wire 283, lever 126, wire 128, lever 130, wire 133, and arm 135, and that the pin 74 introduced value $h$ to the lever 126 so that the pointer 138 balanced when $Vbt \sin g - h = \text{zero}$. Formula No. 1.

It will also be remembered that the lever 53 is connected to the link 48 at the output end of the third multiplying mechanism, 503. In the description of the third multiplying mechanism, 503, it was stated that its output through link 48 to link 53 was $$Vp\left(\frac{Tb}{2}+Tx+t\right)\left(\frac{\cos\frac{g+e}{2}}{\cos\frac{g-e}{2}}\right)$$

The lever 53 adds this value to $Vbt$ introduced at pin 54 and this sum, Formula No. 2, or $$Vp\left(\frac{Tb}{2}+Tx+t\right)\left(\frac{\cos\frac{g+e}{2}}{\cos\frac{g-e}{2}}\right)+Vbt$$

is transmitted to the slant range pointer 91, as well as to the fourth multiplying mechanism, 504, which multiplies this value by sin $e$, which product is transmitted by wire 70 to lever 72 which subtracts the value $h$ from this product and balances the target position angle balance pointer 85 in its mid or zero position when $$\sin e\left\{Vp\left(\frac{Tb}{2}+Tx+t\right)\left(\frac{\cos\frac{g+e}{2}}{\cos\frac{g-e}{2}}\right)+Vbt\right\}-h=0 \quad \text{Formula No. 3}$$

*Mechanical fuze setting knob*

The next factor to be set into the computer is the number of seconds which will elapse between the firing and exploding of the projectile having a mechanical fuze. If a powder fuze is used which would explode at the end of 7 seconds of actual time, and if it is to be fired substantially horizontally, the operator should give it a setting of about 7⁶⁄₁₀ powder fuze setting seconds, but if it is to be fired vertically so as to explode in 7 seconds of actual time, he should give it a setting of about 6⁹⁄₁₀ powder fuze setting seconds. The reason for this is that powder burns faster at low altitudes, and mechanical fuze setting, however, will explode at the actual number of seconds set by the mechanical fuze setting knob 416 irrespective of the direction of firing. If a mechanical fuze is used, the knob 416 should be rotated to represent the number of seconds desired, but if powder fuzes are used the operator should rotate the mechanical fuze setting knob 416 so as to bring the indicator 124 of the powder fuze setting scale to indicate the number of seconds at which the powder fuze is set, such as the 7⁶⁄₁₀ seconds or the 6⁹⁄₁₀ seconds given in the above example. If a powder fuze is used, it would be necessary to set it about 1⁶⁄₁₀ seconds of powder fuze time for it to go off in 1 second of actual time. In this case the operator would rotate the knob 416 until a reading of 1⁶⁄₁₀ seconds was indicated by the powder fuze setting indicator 124.

Figure 14:
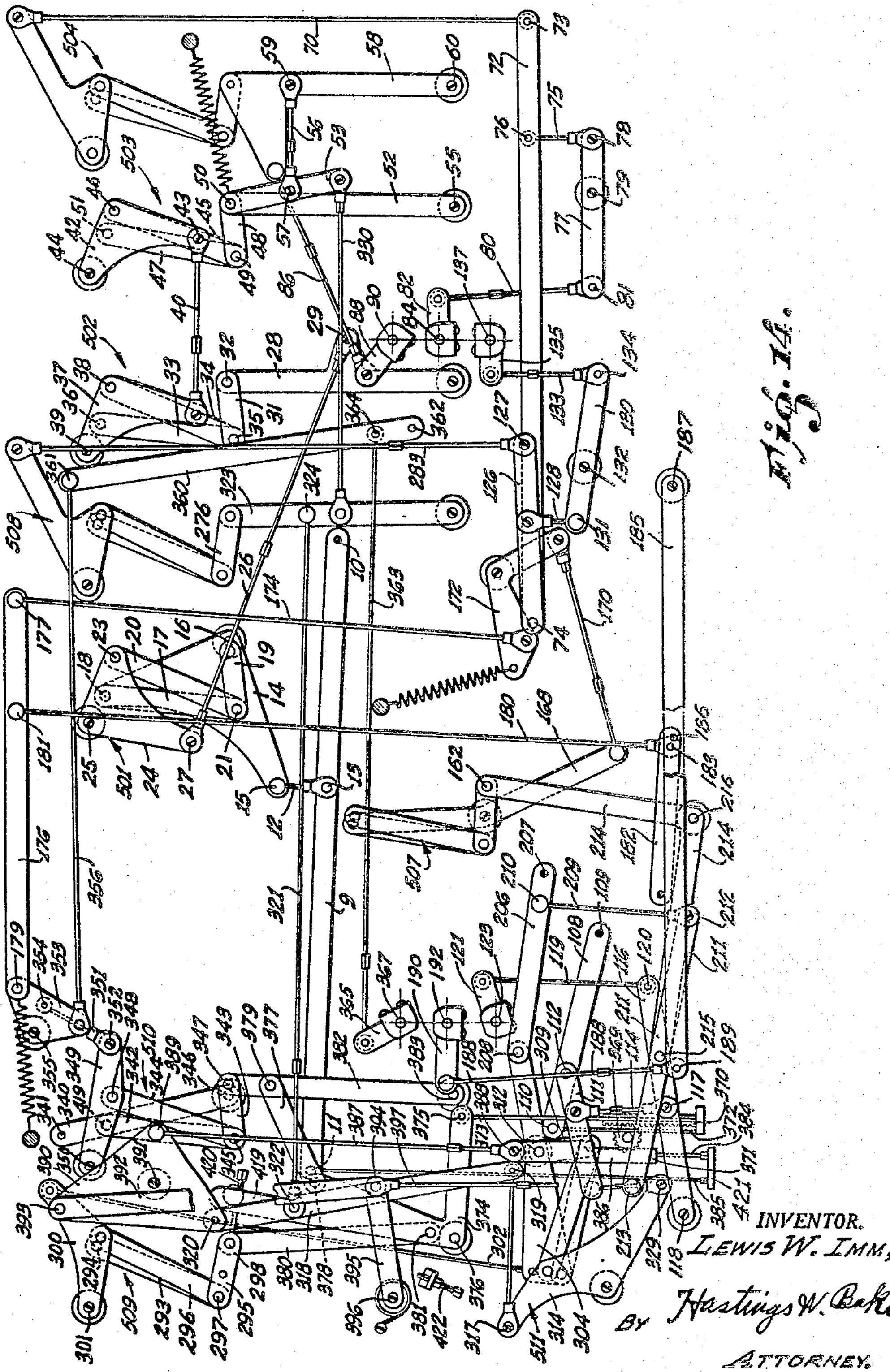
FIGURE 14 is a rear elevational view of the parts moved by the mechanical fuze setting knob.
Figure 15:
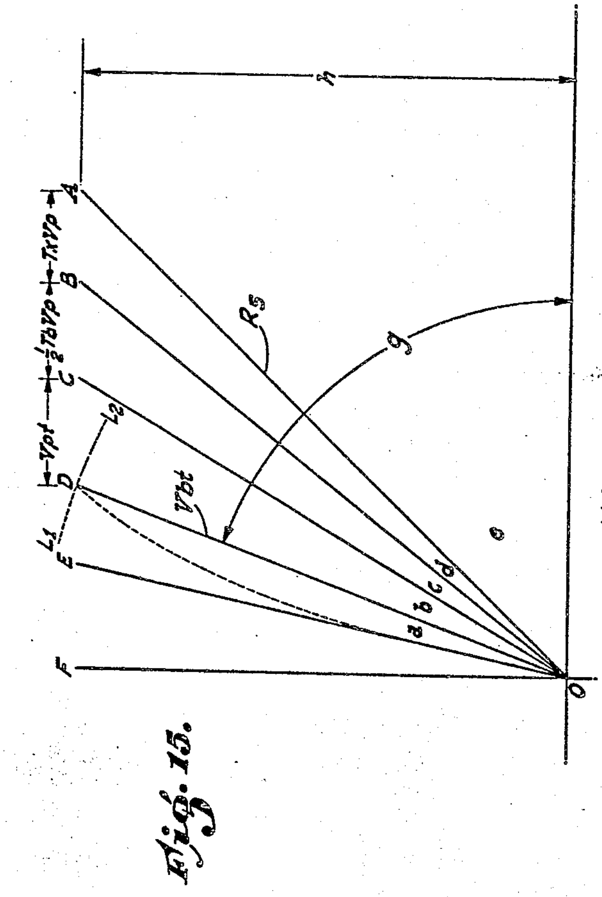

When the knob 416, FIGURE 1, is rotated, it rotates the pinion 369, FIGURE 14, which actuates racks 370 and 371. At this point the motion divides into two parts, one part following rack 370 and one part following rack 371. The rack 370 carries wire 372 and wire 373. Here again the motion divides into two parts, one part following wire 372 and one part following wire 373. Wire 372 is connected to lever 108 by means of pin 110, thereby entering the value $t$. The lever 108, it will be remembered, is mounted on movable pin 109 which is controlled by the altitude knob 412 to enter the value $h$, as well as by the powder fuze spot 413, as heretofore described. Lever 108 actuates lever 111 by means of pin 112, with lever 111 being pivoted on movable pin 113, which, it will be remembered, is actuated by the advance position angle knob 409. The lever 111 is connected by wire 114, lever 116, wire 119, and arm 121 to the powder fuze time pointer 124, as heretofore described.

The wire 373 carries pin 375 connected to lever 374 which is mounted on fixed stud 376. Lever 374 is provided with an upwardly extending arm 419 carrying pin 378 and a contact pin 420. Pin 378 actuates link 377 carrying pin 379 carried by lever 382 mounted on fixed pivot stud 383. The lever 382 carries pin 347 connected to link 343 of the tenth multiplying mechanism 510. It will be remembered that the said tenth multiplying mechanism multiplies the function of $t$ by cos $g$ and transmits this product into lever 353 by means of wire 351. It will also be remembered that this movement is transmitted to the sight angle pointer 193 by lever 176, wire 180, lever 182, lever 185, wire 188, and arm 190, and is also transmitted to the deflection setting pointer 368 by means of wire 356, lever 360, and arm 365. The output from the lever 353 might be stated as being the angle ($a$) instead of a function of $t$ multiplied by cos $g$. The arm 419 of lever 374 carries pin 381 on which is mounted link 380. Link 380 carries pin 298 connected to link 295 which forms a part of the ninth multiplying mechanism, 509, the link 295 entering a function of $t$ while the lever 290 enters sin $g$. The ninth multiplying mechanism multiplies these values together and transmits the resultant motion to wire 302, which operates lever 304 to actuate the pin 208 to enter the function of $t$ and $g$ into lever 206, which at its other end receives the value $Vp$ cos $g$ by the movement of pin 207. The pin 212 of lever 211 is, therefore, moved by pin 210 and link 209 a distance corresponding to a function of $t$ and $g$ plus $Vp$ cos $g$. The other end of lever 211 is moved by pin 213 to enter a function of $t$. The lever 211 adds these values together so that its pin 215 moves a value corresponding to $Vb+Vp$ cos $g$. The means whereby the pin 213 is actuated to enter a function of $t$ will now be explained.

Attached to the lower end of rack 371 is a plate 421 which is connected to a wire 384 which is connected to slide bar 386, which slide bar may be guided by any conventional means, not shown. The slide bar 386 carries a pin 312 on which is hung the link 309. It will be remembered that link 309 is a part of the eleventh multiplying mechanism, 511, described in connection with the advance position angle knob mechanism.

The slide bar 386 carries a pin 388 at its upper end connected to wire 387 extending to pin 389 connected to lever 390, which is pivoted on a fixed stud 391. Lever 390 carries pin 393 from which is hung link 392. Link 392 carries pin 394 connected to link 395 mounted on a fixed stud 396. Pin 394 is also connected to wire 397 which carries pin 213 of lever 211. By the above means a function of $t$ is entered on the lefthand end of lever 211. The stop pin 422 underlies the lever 395 to stop said lever in the zero position of time setting knob 416.

As above mentioned the lever 211 is an additional lever so that its pin 215 is moved $Vb+Vp$ cos $g$. This motion is transmitted to the seventh multiplying mechanism 507 by means of lever 214. It will further be remembered that this value is transmitted through lever 168, wire 170, lever 172, wire 174, lever 176, wire 180, levers 182 and 185, wire 188, and arm 190 to the sight angle pointer 193.

The contact pin 420 on arm 419 of lever 374 is out of contact with lever 380 when ($t$) is between zero and X seconds, X being a small number of seconds, such as 6 or 8 seconds, for instance. The reason for this is that the distances travelled by the projectile in the first X seconds seems to be approximately the same regardless of the direction it is fired. However, if the projectile is fired vertically its per second velocity is not so great after it has travelled X seconds as it would be if fired substantially horizontally. Therefore, no correction is necessary for the first X seconds and, therefore, pin 420 does not contact the lever 380 until $t=X$ seconds. Thereafter the lever 380 is moved to correct for the above differences, and this is the reason that it is stated that link 295 moves in accordance with the function of $t$ instead of the value. $t$.

As heretofore explained, the slide bar 386 carries the pin 312 on which is hung the link 309 entering the value $t$ in the eleventh multiplying mechanism, and thereby actuating the lever 314, pin 329 and lever 111 connected to lever 116 and powder fuze setting pointer 124.

It will also be remembered in connection with the description of the advance position angle knob 409 that the pin 317 of the lever 314 moves according to a function of $t$ and $g$, and this motion is transmitted to pin 319 of lever 318. The pin 320 connects lever 390 to lever 318 whereby is entered a function of $t$, so that the pin 322 of lever 318 moves a distance corresponding to a function of $t$ and a function of $t$ and $g$, or $Vbt$, which is transmitted to pin 324 of lever 323 by means of wire 321. This motion is transmitted to the advance position angle pointer 128 by means of the eighth multiplying mechanism, 508, by wire 283, lever 126, wire 128, lever 130, wire 133, and arm 135. This value $Vbt$ is also transmitted to lever 53 by means of wire 330 and through wire 56, lever 58, wire 86, and arm 88 to the slant range pointer shaft 90 and also through the fourth multiplying mechanism 504, wire 70, lever 72, wire 75, lever 77, wire 80 and arm 82 to the target position pointer 85.

The plate 421 carried by the rack 371 also carries a wire 385 which extends upwardly to pin 11 carried by lever 9. It will be remembered that pin 11 entered the value $t$ into lever 9 while pin 10 entered the value $$\frac{Tb}{2}+Tx$$

which lever 9 added these values and moved pin 13, wire 12, and pin 15 to enter the value of $$\frac{Tb}{2}+Tx+t$$

in the first multiplying mechanism, 501, which value was transmitted through the second and third multiplying mechanisms to the slant range pointer 91 and through the second, third, and fourth multiplying mechanisms to the target position angle pointer 85, as was fully described in connection with FIGURE 9.

*Correction factors*

As has heretofore been described, the fuze spot knob 413 may be used to correct for under-timing or over-timing when a powder fuze is used. In case it is found that the projectile is firing too high or too low correction can be made by operating the elevation spot knob 415 which turns the pinion 397, FIGURE 11, which moves the rack 398 connected to wire 399 by pin 400. Wire 399 is connected to lever 182 by pin 184. It will be remembered that pin 186 of lever 182 is connected to lever 185 which is connected by wire 188 to arm 190 of the sight angle pointer 193. It will also be remembered that pin 183 is moved to represent the value $$a+\tan^{-1}\left(\frac{Vp \sin g}{Vb+Vp \cos g}\right)$$

and the pin 184 is moved to represent the value of elevation spot. The lever 182 adds these two values and transmits it to the pointer 193 by means of the lever 185, wire 188, and arm 190 so as to give a direct reading of the solution of Formula No. 5 for the sight angle.

The deflection spot knob is used to correct for the projectile firing to the right or left of the target. If a gun when fired with data obtained from the computer consistently shoots to the right or left of the target, it would indicate that some error of the gun sighting mechanism or the data from which the computer was designed was the cause. The deflection spot knob 415 can be moved until the data obtained from the deflection pointer and set into the gun caused the gun to shoot in a line with the target. The deflection spot knob does not control any other pointers.

The deflection spot knob 407 turns pinion 404 which carries rack 405 connected to wire 406. Wire 406 is connected to slide bar 428 having a guide 429 supported by the frame of the machine. Slide bar 428 is connected to pin 362 of lever 360. It will be remembered that the pin 361 of lever 360 receives the value of a function of $t$ and $g$, which is equal to the angle ($a$). The lever 360 adds this value ($a$) to the deflection spot entered by means of pin 362. The pin 364 of lever 360 transmits this sum to arm 365 and the deflection setting pointer 368 thereby solving Formula No. 4.

From the above it is apparent that the slant range pointer 91 is controlled by preparation time knob, FIGURE 9, barrage time knob, FIGURE 9, target speed knob, FIGURE 12, target position angle knob, FIGURE 8, advance position angle knob, FIGURE 13 and mechanical fuze setting knob, FIGURE 14.

The target position balance pointer 85 is controlled by:

Preparation time knob (FIGURE 9)
Barrage time knob (FIGURE 9)
Altitude knob (FIGURE 10)
Target speed knob (FIGURE 12)
Target position angle knob (FIGURE 8)
Advance position angle knob (FIGURE 13)
Mechanical fuze setting knob (FIGURE 14).

The advance position angle balance pointer 138 is controlled by:

Altitude knob (FIGURE 10)
Advance position angle knob (FIGURE 13)
Mechanical fuze setting knob (FIGURE 14).

The deflection setting pointer 368 is controlled by:

Advance position angle knob (FIGURE 13)
Mechanical fuze setting knob (FIGURE 14)
Deflection spot knob (FIGURE 11).

The sight angle pointer 193 is controlled by:

Target speed knob (FIGURE 12)
Advance position angle knob (FIGURE 13)
Mechanical fuze setting knob (FIGURE 14)
Elevation spot knob (FIGURE 11).

The powder fuze setting pointer 124 is controlled by:

Altitude knob (FIGURE 10)
Advance position angle knob (FIGURE 13)
Mechanical fuze setting knob (FIGURE 14)
Powder fuze spot knob (FIGURE 11).

As heretofore explained, the various factors other than target position angle and advance position angle or mechanical fuze setting should first be entered into the computer, and then the target position angle knob 408 and the advance position angle knob 409 or the mechanical fuze setting knob 416 should be rotated so as to bring the pointers 85 and 138 into their mid or zero or balanced positions. The readings may then be taken accurately.

As an illustration of how the computer functions, the following examples might be given:

*Example 1.*—Set into the computer the preparation time by rotating knob 410, the barrage time by rotating knob 411, the target position angle by rotating the knob 408, the altitude by rotating the knob 412 and the target speed by rotating the knob 414. The operator should then turn the advance position angle knob 409 and simultaneously turn the mechanical fuze setting knob 416 until the target position angle balance pointer 85 and the advance position angle balance pointer 138 are in their mid positions. The following readings may now be made:

(1) The mechanical fuze setting may be read by noting the position of knob 416 relative to its scale, provided a mechanical fuze is used, or noting the position of the indicator 124 in case a powder fuze is used.

(2) Sight angle—by noting the position of the pointer 193.

(3) Deflection setting—by noting the position of the pointer 368.

(4) Slant range—by noting the position of the pointer 91.

(5) Advance position angle—by noting the position of knob 409 relative to its scale.

*Example 2.*—When the operator wishes to use a predetermined mechanical fuze setting, he should enter the following variables:

(1) Mechanical fuze setting—by rotating the knob 416.
(2) Barrage time—by rotating the knob 411.
(3) Altitude—by rotating the knob 412.
(4) Target speed—by rotating the knob 414.

The operator should now turn the advance position angle knob 409 until the advance position angle balance pointer 138 is in its mid or zero position. He should also turn the target position angle knob until the target position angle balance pointer 85 balances in its zero position. In this case the knobs 408 and 409 can be turned simultaneously or sepaartely. The following readings may now be obtained:

(1) Sight angle—by noting the position of pointer 193.
(2) Deflection setting—by noting the position of pointer 368.
(3) Slant range—by noting the position of pointer 191.
(4) Target position angle—by noting the position of the knob 408 relative to its scale.
(5) Advance position angle—by noting the position of knob 409 relative to its scale.

The fuze setting device is adjusted in accordance with the first of these indications, and the gunsight in accordance with the second and third. The target is then observed with conventional range finding apparatus giving an indication of the slant range, and when the slant range thus observed becomes equal to that indicated by the pointer 91, the firing order is given. Alternatively, the target may be observed with a simpler device such as a telescopic sight having angle indicating means; in which case the firing order is given when the observed target position angle becomes equal to that indicated by the knob 408. The indication of the advance position angle afforded by the knob 409 is not essential in either type of operation, but is useful because it is desirable to plan barrage fire so that it will be effective against the target at an advance position angle low enough to prevent the target from reading its own bomb release position.

In the general purpose triangle solver of FIGURES 18 to 22, the balancing of three simultaneously solved equations is indicated by a single balance indicator. The known factors, that is, sides or angles of a triangle of any shape, are entered by means of rotatable knobs and the remaining knobs are then manually rotated until the balance indicator is brought to a zero indication. When this has been done, any unknown side or angle may be read from the indicator associated with its knob, the base may be read from a dial indicator, and the area from another dial indicator.

*Detailed description of triangle solver*

Referring to FIGURE 21 of the drawings, the instrument is shown as contained in a casing 606 within which a main plate 607 is positioned by spacer posts 607*a*. A bearing plate 607*b* is secured to the main plate 607, and also supported on said main plate is a top plate 608 spaced therefrom by supporting blocks 608*a* (FIGURE 20). A dial plate 609 is carried by the top plate 608, being spaced therefrom by supporting posts 609a. Face plate 614 closes the front of the casing 606 and is carried thereby.

The first of the three equations solved by this instrument (i.e., $V \sin \beta - R_s \sin \alpha = 0$) is solved by a subtracting linkage in combination with two sine mechanism and linkage multiplier combinations which convert the angular movement of the $\alpha$ and $\beta$ input knob shafts to linear movements corresponding to the respective sine values, and then separately multiply these values by the respective V and $R_s$ values introduced by the V and $R_s$ input knobs; subtracting the products to obtain an indication of balancing of the equation.

Multiplication of the sine of angle $\beta$ by the value of side V is effected by one of these two sine mechanism and linkage multiplier combinations. The angular value $\beta$ is entered by manual rotation of knob 610 (FIGURE 18) fixed to shaft 615 (FIGURE 21) which is journaled in bearings in bearing plate 607b and top plate 608. Adjacent its opposite end, shaft 615 has secured thereto a gear 616 meshing with a gear 617 secured to a shaft 618 journaled in bearing plate 607b.

Mechanism for converting the angular value $\beta$ into linear movement proportional to the sine of angle $\beta$ is actuated by shaft 618. This mechanism corresponds to that shown in FIGURE 21 of my application Serial No. 746,512, filed May 7, 1947, now Patent No. 2,665,069, issued January 5, 1954, and comprises a ring gear 620 (FIGURES 19 and 21) fixed to the main plate 607 and surrounding an aperture 621 therein through which shaft 618 extends. Secured to the end of shaft 618 is a crank arm 622 having a pin 623 thereon radially spaced from shaft 618 and journaled on pin 623 is a gear 624 meshing with ring gear 620. Secured to the face of gear 624 is a crank 625 having a pin 626 radially spaced from the center of gear 624 and pivotally mounted on pin 626 is a link 627 which thus has imparted to it linear movement proportional to the sine of angle $\beta$.

This linear movement is transmitted to a linkage multiplier of the kind shown and described in Imm Patent No. 2,394,180, dated February 5, 1946 as one input of said multiplier. For this purpose the opposite end of link 627 is pivotally connected to a bell crank 630 pivotally mounted on main plate 607 at 631. This bell crank 630 corresponds to the link 49 of said patent and is pivotally connected to a second link 632 corresponding to the link 47 of said patent, which in turn is pivotally connected to a third link 633 corresponding to the link 86 of said patent.

Mechanism is provided for entering the linear value V into said multiplier as the second input thereof. The value V is entered by manual rotation of knob 611 (FIGURE 18) secured to a shaft 635 (FIGURE 21) journalled in bearings in bearing plate 607b and top plate 608. Secured on shaft 635 is a gear 636 meshing with a sector 637 secured to a shaft 638 journalled in main plate 607 and having an arm 640 (see also FIGURE 19) secured to its opposite end. Pivotally mounted on the main plate 607 at 641 is an arm 642 paralleling the arm 640 and connected thereto by a link 643 pivotally secured to both arms so that they will move in unison. Pivotally secured to the free end of arm 642 is a link 644, the opposite end of which is secured to the link 633 at a point coaxial with its pivotal connection with link 632 to thus enter the value V into the multiplier.

The product $V \sin \beta$ is transmitted from the multiplier to a subtracting link. For this purpose the end of link 633 opposite its pivoted connection with link 644 is pivotally connected at 644a to an arm 645 which is secured to a shaft 646 journaled in main plate 607. At its opposite end (see FIGURE 20) shaft 646 has secured thereto an arm 647 the opposite end of which is pivotally connected at 648 to a subtracting link 650.

Multiplication of the sine of angle $\alpha$ by the value of side $R_s$ is effected by the other of the previously mentioned sine mechanism and linkage multiplier combinations. The angular value of $\alpha$ is entered by manual rotation of knob 612 which, by an arrangement corresponding to that described herein in connection with the entry of the angular value $\beta$, actuates a sine mechanism 655 connected by link 656 with a linkage multiplier 657.

Similarly, mechanism is provided for entering the linear value $R_s$ into the multiplier 657. This value is entered by rotation of a knob 613 which by an arrangement corresponding to that described in connection with the entry of value V, actuates arm 658 connected by a link 660 with multiplier 657.

The product $R_s \sin \alpha$ is transmitted from the multiplier 657 to the subtracting link 650. For this purpose the multiplier 657 is connected by an arm 661 with a shaft 662 journaled in main plate 607 and having secured to its opposite end (see FIGURE 20) an arm 663 the free end of which is connected to the link 650 by a link 664 pivotally connected to arm 663 and link 650.

The difference $V \sin \beta - R_s \sin \alpha$ is transmitted from link 650 to a balance indicator. The balance indicator 670 (FIGURES 18 and 20) is pivotally mounted on the top plate 608 at 671 and extends in front of the dial plate 609 against which it is visible through an opening 672 in the face plate 614. A link 673 pivotally connected to the subtracting link 650 and to the indicator 670 aligns the indicator with a balance indicating indicium 674 whenever $V \sin \beta - R_s \sin \alpha = 0$.

The second of the three equations solved by this instrument (i.e., $V \cos \beta + R_s \cos \alpha = C$) is solved by an additive linkage in combination with two cosine mechanism and linkage multiplier combinations which convert the angular movement of the $\alpha$ and $\beta$ input knob shafts to linear movements corresponding to the respective cosine values, and then separately multiply these values by the respective V and $R_s$ values introduced by the previously mentioned input knobs; adding the products to obtain the desired value of the base of the original triangle.

Multiplication of the cosine of angle $\beta$ by the value of side V is effected by one of these two cosine mechanism and linkage multiplier combinations. The previously mentioned entry of angular value $\beta$ by rotating gear 616 also rotates a gear 675 meshing therewith and secured to a shaft 676 journaled in bearing plate 607b.

Mechanism for converting the angular value $\beta$ into linear movement proportional to the cosine of angle $\beta$ is actuated by shaft 676. It comprises a ring gear 677 fixed to the main plate 607 and surrounding an aperture 678 therein through which shaft 676 extends. Secured to the end of shaft 676 is a crank arm 678a having a pin 680 thereon radially spaced from shaft 676 and journaled on pin 680 is a gear 681 meshing with ring gear 677. Secured to the face of gear 681 is a crank 682 having a pin 683 radially spaced from the center of gear 681 and pivotally mounted on pin 683 is a link 684 which thus has imparted to it linear movement which, due to the 90° offset of the center of 681 from the center of gear 624, will be proportional to the cosine of angle $\beta$.

This linear movement is transmitted to a linkage multiplier as one input of said multiplier. For this purpose the opposite end of link 684 (FIGURE 19) is pivotally connected to a bell crank 685 pivotally mounted on a main plate 607 at 686. This bell crank 685 is pivotally connected to a second link 687, which in turn is pivotally connected to a third link 688. The linear value of V is entered into said multiplier by a link 690 which is pivotally secured to the free end of the previously mentioned arm 640. The opposite end of link 690 is secured to link 688 at a point which in FIGURE 19 is coaxial with its pivotal connection with link 687, to thus enter the value V into the multiplier.

The product $V \cos \beta$ is transmitted from the multiplier to an additive link. For this purpose the end of link 688 opposite its pivoted connection with link 690 is pivotally connected at 688a to an arm 691 which is secured to a shaft 692 journaled in main plate 607. At its opposite end shaft 692 (FIGURE 20) has secured thereto an arm 693, the opposite end of which is pivotally connected at 694 to a link 695 the opposite end of which is pivotally connected at 696 to an additive link 697.

Multiplication of the cosine of angle $\alpha$ by the value of $R_s$ is effected by the other of the previously mentioned cosine mechanism and linkage multiplier combinations. The angular value of $\alpha$ which is entered by manual rotation of knob 612 actuates a cosine mechanism 700 connected by link 701 with a linkage multiplier 702.

Similarly, mechanism is provided for entering the linear value of $R_s$ into the multiplier 702. The previously mentioned entry of $R_s$ actuates an arm 703 connected to arm 658 by link 703a, and connected by a link 704 with multiplier 702.

The product $R_s \cos \alpha$ is transmitted from the multiplier 702 to the additive link 697. For this purpose the multiplier 702 is connected by an arm 705 with a shaft 706 journaled in main plate 607 and having secured to its opposite end an arm 707 (FIGURE 20) the free end of which is pivotally connected to link 697 at 707a.

The sum $V \cos \beta + R_s \cos \alpha$ is transmitted from link 697 to the base C indicator 708. The base C indicator 708 (FIGURES 18 and 20) is pivotally mounted on the top plate 608 at 709 in an arrangement similar to that described for the balance indicator. A link 710 is pivotally connected to the additive link 697 and to the indicator 708. Whenever the balance indicator 670 indicates zero, indicator 708 gives a direct reading of the unknown base C of the original triangle on calibrated dial 711 visible through an opening 711a in the face plate 614.

The third of the three equations solved by this instrument (i.e., $\frac{1}{2} R_s \sin \alpha \, (V \cos \beta + R_s \cos \alpha) = \text{area}$) is solved by a linkage multiplier which multiplies the previously obtained length of the base line C by the value of $R_s \sin \alpha$ which was also previously solved and using a dial calibrated to read one half the product which now shows the area of the original triangle.

For this purpose a second link 712 (FIGURE 20) is pivotally attached to the previously described arm 663. The free end of link 712 is connected to an arm 713 which is secured to a shaft 714 (see also FIGURE 19) journaled in main plate 607. At its opposite end shaft 714 has secured thereto an arm 715 connected by a link 716 with multiplier 717. Mechanism is provided for entering the value of the base C into multiplier 717 as the second input thereof. A link 718 (FIGURE 20) is pivotally connected to the previously mentioned additive link 697. The free end of link 718 is pivotally connected to an arm 720 which is secured to a shaft 721 journaled in main plate 607. At its opposite end shaft 721 has secured thereto an arm 722 which constitutes the second input in said multiplier. The output is transmitted from the multiplier through an arm 722a which is secured to a shaft 723 journaled in main plate 607. At its opposite end (FIGURE 20) shaft 723 has secured thereto an arm 724 the opposite end of which is pivotally connected to a link 725. The free end of link 725 is pivoted to link 726. One end of link 726 is pivotally mounted on main plate 607 at 727 while the other end of link 726 is pivoted to link 728. The free end of link 728 is pivoted to arm 730 of an area indicator 731 which is pivotally mounted on the top plate 608 at 732. Whenever the balance indicator 670 indicates zero, indicator 731 gives a direct reading of the unknown area of the original triangle on dial 733 visible through an opening 734 in the face plate 614; dial 733 being calibrated to read one half the product $R_s \sin \alpha \, (V \cos \beta + R_s \cos \alpha)$.

The embodiments of the invention shown and described herein are illustrative of two preferred forms in which the present invention may be employed, but it will be appreciated that it is susceptible of embodiment in various forms and that the invention, therefore, is not to be regarded as restricted except as required by the appended claims.

I claim:

1. In a computer, a first element adjustable to register a value equal to the value of a side of a right triangle, a second element adjustable to register a value equal to the value of the hypotenuse of said triangle, a third element adjustable to register a value equal to the value of the angle opposite the aforementioned side of said triangle, an equation balance registering device movable in opposite directions from a balance registering position, means operated by said first element for displacing said device in one direction an amount proportional to the value registered by said element, and means jointly controlled by said second and third elements for multiplying the value registered by said second element by the sine of the angle registered by said third element and displacing said device in the opposite direction an amount proportional to the product of said multiplication; said device being disposed in balance registering position wherever the product of said multiplication is equal to the value registered by said first element.

2. In a computer, a first element adjustable to register a value equal to the value of the side of a right triangle, a second element adjustable to register a value equal to the value of the hypotenuse of said triangle, a third element adjustable to register a value equal to the value of an acute angle of said triangle, an equation balance registering device movable in opposite directions from a balance registering position, means operated by said first element for displacing said device in one direction an amount proportional to the value registered by said element, and means jointly controlled by said second and third elements for multiplying the value registered by said second element by a function of the angle registered by said third element and displacing said device in the opposite direction an amount proportional to the product of said multiplication; said device being disposed in its balance registering position whenever the product of said multiplication is equal to the value registered by said first element.

3. In a computer, a first element adjustable to register a value equal to the altitude of a triangle other than a right triangle, a second element adjustable to register a value equal to the value of one side of such a triangle, a third element adjustable to register a value equal to the value of the angle included between said side and the base of said triangle, a fourth element adjustable to register a value equal to the value of the second side of said triangle, a fifth element adjustable to register a value equal to the value of the angle included between said second side and the base of said triangle, a pair of equation balance registering devices each movable in opposite directions from a balance registering position, means operated by said first element for displacing both of said devices by amounts proportionate to the value registered by said element, means jointly controlled by said second and third elements for multiplying the value registered by said second element by the sine of the angle registered by said third element and displacing one of said devices in a direction opposite to that in which it was displaced by said first element and by an amount proportional to the product of said multiplication, and means jointly controlled by said fourth and fifth elements for multiplying the value registered by said fourth element by the sine of the angle registered by said fifth element and displacing the other of said devices in a direction opposite to that in which it was displaced by said first element and by an amount proportional to the product of said multiplication; both of said devices being disposed in their balance registering positions when the products of the respective multiplications are equal to the value registered by said first element.

4. In a computer, a first element adjustable to register a value equal to the value of one side of a triangle other than a right triangle, a second element adjustable to register a value equal to the value of the angle included between said side and the base of said triangle, a third element adjustable to register a value equal to the value of the second side of said triangle, a fourth element adjustable to register a value equal to the value of the angle included between said second side and the base of said triangle, a first multiplying means controlled by said first and second elements to multiply the value registered by said first element by the sine of the angle registered by said second element, and including an output member displaced an amount proportionate to the product of said multiplication, a second multiplying means controlled by said third and fourth elements to multiply the value registered by said third element by the sine of the angle registered by said fourth element, and including an output member displaced an amount proportionate to the product of said multiplication, and balance registering means adjustable by said output means to register a balanced condition whenever the products of said multiplications are equal to each other.

5. In a computer, an equation balance registering device movable in opposite directions from a balance registering position, means for displacing said device in one direction comprising a first element adjustable to register a linear value equal to the value of a side of a triangle, a second element angularly adjustable to register a value equal to the value of the angle included between said side and the base of the triangle, a first sine mechanism having an input angularly adjustable by said second element and an output linearly adjustable thereby in an amount proportional to the sine of the angle through which said input is adjusted, and means jointly controlled by said first element and by the output of said first sine mechanism for multiplying the value registered by said first element by the sine of the angle registered by said second element; and means for displacing said device in the opposite direction comprising a third element linearly adjustable to register a value equal to the value of another side of said triangle, a fourth element angularly adjustable to register a value equal to the value of the angle included between said another side and the base of said triangle, a second sine mechanism having an input angularly adjustable by said fourth element and an output linearly adjustable thereby in an amount proportional to the sine of the angle through which said input is adjusted and means jointly controlled by said third element and by the output of said second sine mechanism for multiplying the value registered by said third element by the sine of the angle registered by said fourth element; said balance registering device being disposed in balance registering position whenever the products of said multiplications are equal.

6. A computer according to claim 5 including means jointly controlled by said first and second elements for multiplying the value registered by said first element by the cosine of the angle registered by said second element, means jointly controlled by said third and fourth elements for multiplying the value registered by said third element by the cosine of the angle registered by said fourth element, means jointly controlled by said multiplying means for adding the products of said multiplications, and means controlled by said adding means for registering a value equal to the value of the base of said triangle.

7. A computer according to claim 6 including a multiplying mechanism jointly controlled by the aforesaid means for displacing said balance registering device and by the aforesaid adding means, and means controlled by said mechanism for registering a value equal to the value of the area of said triangle.

8. In a computer, a plurality of balance registering devices, actuating means for said devices comprising a plurality of elements adjustable to represent equation factors, a system of interconnected levers interconnecting said elements and said devices and operable to transmit movement between said elements and said plurality of balance registering devices and to move both of said balance registering devices toward or away from balance registering position, an additional element adjustable to represent an additional equation factor, and a supplementary system of interconnected levers interconnecting said additional element and one only of said balance registering devices and operable to transmit movement between said additional element and one only of said balance registering devices and to move said balance registering device toward or away from balance registering position; and computing mechanism comprising a computing system of interconnected parts including parts forming a mechanical representation of the relationships between the values of the equation factors represented by the adjustments of all of said elements, and having an operating connection with each of said lever systems for operation thereby, whereby said computing system is adjustable by all of said elements and movement of said balance registering devices to balance registering position by said elements will occur only when said elements are adjusted to values balancing the equation represented by said system.

9. A computer according to claim 8 in which levers included in said first two mentioned systems constitute a part of the system of interconnected parts comprised in said computing system.

References Cited in the file of this patent

UNITED STATES PATENTS

| | | |
|---|---|---|
| 1,940,518 | Watson et al. | Dec. 19, 1933 |
| 1,943,403 | Watson | Jan. 16, 1934 |
| 2,385,952 | Svoboda | Oct. 2, 1945 |
| 2,403,542 | Newell | July 9, 1946 |
| 2,404,387 | Lovell et al. | July 23, 1946 |
| 2,408,081 | Lovell et al. | Sept. 24, 1946 |

FOREIGN PATENTS

| | | |
|---|---|---|
| 140,441 | Great Britain | Apr. 28, 1921 |
| 284,804 | Great Britain | Feb. 9, 1925 |